US012206101B2

(12) United States Patent
Thackeray et al.

(10) Patent No.: US 12,206,101 B2
(45) Date of Patent: Jan. 21, 2025

(54) DISORDERED ROCK SALT ELECTRODES FOR LITHIUM BATTERIES

(71) Applicant: UCHICAGO ARGONNE, LLC, Chicago, IL (US)

(72) Inventors: Michael M. Thackeray, Naperville, IL (US); Eungje Lee, Naperville, IL (US); Jason R. Croy, Plainfield, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 964 days.

(21) Appl. No.: 17/203,999

(22) Filed: Mar. 17, 2021

(65) Prior Publication Data

US 2021/0210755 A1    Jul. 8, 2021

Related U.S. Application Data

(60) Division of application No. 16/233,369, filed on Dec. 27, 2018, now abandoned, which is a
(Continued)

(51) Int. Cl.
*H01M 4/505* (2010.01)
*H01M 4/131* (2010.01)
(Continued)

(52) U.S. Cl.
CPC .......... *H01M 4/505* (2013.01); *H01M 4/131* (2013.01); *H01M 4/366* (2013.01); *H01M 4/525* (2013.01); *H01M 10/0525* (2013.01); *Y02E 60/10* (2013.01)

(58) Field of Classification Search
None
See application file for complete search history.

(56) References Cited

U.S. PATENT DOCUMENTS

| 5,153,081 | A | 10/1992 | Thackeray et al. |
| 5,160,712 | A | 11/1992 | Thackeray et al. |

(Continued)

FOREIGN PATENT DOCUMENTS

WO    2012067675    5/2012

OTHER PUBLICATIONS

Amatucci, G. et al., Optimization of Insertion Compounds Such as LiMn2O4 for Li-Ion Batteries, Journal of the Electrochemical Society, 149 (12), K31-K46, (2002).
(Continued)

*Primary Examiner* — Wyatt P Mcconnell
(74) *Attorney, Agent, or Firm* — Olson & Cepuritis, Ltd.

(57) ABSTRACT

Cation-stabilized materials and compositions are described herein, which suppress the structural and electrochemical instability of lithium-metal-oxide spinel and lithiated lithium-metal-oxide spinel electrodes for lithium batteries, notably lithium-ion batteries. The lithium metal oxide electrode material comprises a disordered rock salt structure with partial lithiated-spinel character, wherein, for example, the disordered rock salt structure comprises a formula $Li_2(M''_{2-a}M'''_a)O_4$, which has the crystallographic formula: $[Li_{2-b}M'''_b]_{16c}[M''_{2-a}M'''_{a-b}Li_b]_{16d}O_4$ wherein 16c and 16d refer to the octahedral sites of the prototypic space group symmetry $Fd\bar{3}m$; M'' and M''' are metal ions; $0 < a \leq 0.5$; and $0 < b < 0.5$. These stabilized materials are useful as positive electrodes for lithium batteries in their own right or when used as a structural component to stabilize layered metal oxide electrode systems, such as a two-component layered-layered system or a multi-component layered-layered-spinel system.

22 Claims, 18 Drawing Sheets

Related U.S. Application Data continuation-in-part of application No. 15/793,577, filed on Oct. 25, 2017, now abandoned.

(60) Provisional application No. 62/514,086, filed on Jun. 2, 2017.

(51) Int. Cl.
| | |
|---|---|
| H01M 4/36 | (2006.01) |
| H01M 4/525 | (2010.01) |
| H01M 10/0525 | (2010.01) |

(56) References Cited

U.S. PATENT DOCUMENTS

| | | |
|---|---|---|
| 5,316,877 A | 5/1994 | Thackeray et al. |
| 5,981,106 A | 11/1999 | Amine et al. |
| 6,482,374 B1 | 11/2002 | Kumar et al. |
| 6,555,269 B2 | 4/2003 | Cho et al. |
| 6,677,082 B2 | 1/2004 | Thackeray et al. |
| 6,680,143 B2 | 1/2004 | Thackeray et al. |
| 6,878,487 B2 | 4/2005 | Cho et al. |
| 6,916,580 B2 | 7/2005 | Cho et al. |
| 6,984,469 B2 | 1/2006 | Kweon et al. |
| 7,087,348 B2 | 8/2006 | Holman et al. |
| 7,138,209 B2 | 11/2006 | Kweon et al. |
| 7,303,840 B2 | 12/2007 | Thackeray et al. |
| 7,314,682 B2 | 1/2008 | Thackeray et al. |
| 7,384,664 B2 | 6/2008 | Oesten et al. |
| 7,445,871 B2 | 11/2008 | Suh et al. |
| 7,468,223 B2 | 12/2008 | Thackeray et al. |
| 7,635,536 B2 | 12/2009 | Johnson et al. |
| 7,790,308 B2 | 9/2010 | Johnson et al. |
| 7,927,506 B2 | 4/2011 | Park |
| 7,935,270 B2 | 5/2011 | Park |
| 8,080,340 B2 | 12/2011 | Thackeray et al. |
| 8,808,912 B2 | 8/2014 | Thackeray et al. |
| 9,070,489 B2 | 6/2015 | Sharma et al. |
| 2001/0046628 A1 | 11/2001 | Oesten et al. |
| 2003/0108790 A1 | 6/2003 | Manthiram et al. |
| 2005/0026040 A1 | 2/2005 | Thackeray et al. |
| 2005/0153206 A1 | 7/2005 | Oesten et al. |
| 2006/0216605 A1 | 9/2006 | Shirakata et al. |
| 2009/0136839 A1 | 5/2009 | Kraznov et al. |
| 2009/0224212 A1 | 9/2009 | Manthiram et al. |
| 2010/0086853 A1 | 4/2010 | Venkatachalam et al. |
| 2010/0190058 A1 | 7/2010 | Thackeray et al. |
| 2010/0207577 A1 | 8/2010 | Sugiyama et al. |
| 2012/0263998 A1 | 10/2012 | Thackeray et al. |
| 2013/0078518 A1 | 3/2013 | Thackeray et al. |
| 2013/0149609 A1* | 6/2013 | Deng .................. H01M 4/505 429/223 |
| 2014/0127398 A1 | 5/2014 | Thackeray et al. |
| 2015/0180032 A1 | 6/2015 | Thackeray et al. |

OTHER PUBLICATIONS

Amine, K. et al., A New Three-Volt Spinel Li1+xMn1.5Ni0.5O4 for Secondary Lithium Batteries, Journal Electrochemical Society, vol. 143, (5), 1607-1613 (1996).

Arunkumar, T.A. et al., Influence of Lattice Parameter Differences on the Electrochemical Performance of the 5 V Spinel LiMn1.5-yNi0.5-zMy+zO4 (M=Li, Mg, Fe, Co, and Zn), Electrochemical and Solid State Letters, vol. 8, (8), A403-A405 (2005).

Belharouak, I. et al., Identification of LiNi0.5O4 Spinel in Layered Manganese Enriched Electrode Materials, Electrochemistry Communications 13, 232-236 (2011).

Cabana, J. et al., Structural and Electrochemical Characterization of Composite Layered-Spinel Electrodes Containing Ni and Mn for Li-Ion Batteries, Journal of The Electrochemical Society 156 (9), A730-A736 (2009).

Cabana, J. et al., Structural Complexity of Layered-Spinel Composite Electrodes for Li-Ion Batteries, J. Mater. Res. 25 (8), 1601-1616 (2010).

Chen, Z. et al., Effect of a ZrO2 Coating on the Structure and Electrochemistry of LixCoO2 When Cycled to 4.5 V, Electrochemical and Solid State Letters, 5 (10), A213-A216, (2002).

Cho, J. et al., Novel LiCoO2 Cathode Material with Al2O3 Coating For A Li Ion Cell, Chemistry of Materials 12, 3788-3791, (2000).

Cho, J. et al., High-Performance ZrO2-Coated LiNiO2 Cathode Material, Electrochemical and Solid-State Letters, 4 (10), A159-A161, (2001).

Choi, W. et al., Superior Capacity Retention Spinel Oxyfluoride Cathodes for Lithium-Ion Batteries, Electrochemical and Solid State Letters, 9 (5), A245-A248 (2006).

Croy, J. R., et al., Designing High-Capacity, Lithium-Ion Cathodes Using X-ray Absorption Spectroscopy, Chemistry of Materials 23, 5415-5424 (2011).

Croy, J. R. et al., Li2MnO3-Based Composite Cathodes for Lithium Batteries: A Novel Synthesis Approach and New Structures, Electrochemistry Communications 13, 1063-1066 (2011).

Gummow, R.J. et al., Improved Capacity Retention in Rechargeable 4 V Lithium/Lithium-Manganese Oxide (Spinel) Cells, Solid State Ionics 69, 59-67 (1994).

Gummow, R.J. et al., A Reinvestigation of the Structures of Lithium-Cobalt-Oxides With Neutron-Diffraction Data, Mat. Res. Bull. 28 (11), 1177-1184 (1993).

Gummow, R.J. et al., Spinel Versus Layered Structures for Lithium Cobalt Oxide Synthesised at 400° C., Mat. Res. Bull. 28 (3), 235-246 (1993).

Gummow, R.J. et al., Characterization of LT-LixCo1-yNiyO2 Electrodes for Rechargeable Lithium Cells, Journal of The Electrochemical Society 140 (12) 3365-3368 (1993).

Gummow, R.J. et al., Lithium-Cobalt-Nickel-Oxide Cathode Materials Prepared at 400° C. for Rechargeable Lithium Batteries, Solid State Ionics 53-56, 681-687 (1992).

Gummow, R.J. et al., Structure and Electrochemistry of Lithium Cobalt Oxide Synthesised at 400° C., Mat. Res. Bull. 27 (3), 327-337 (1992).

Jafta, C.J. et al., Microwave-Assisted Synthesis of High-Voltage Nanostructured LiMn1.5Ni0.5O4 Spinel: Tuning the Mn3+ Content and Electrochemical Performance, ACS Applied Materials and Interfaces, vol. 5, 7592-7598 (2013).

Johnson, C.S. et al., Lithium-Manganese Oxide Electrodes with Layered-Spinel Composite Structures xLi2MnO3•(1-x)Li1+yMn2-yO4 (0 <x< 1, 0 ≤ y ≤ 0.33) for Lithium Batteries, Electrochemistry Communications 7, 528-536 (2005).

Johnson, C.S. et al., Anomalous Capacity and Cycling Stability of xLi2MnO3 • (1-x)LiMO2 Electrodes (M=Mn, Ni, Co) in Lithium Batteries at 50° C., Electrochemistry Communications 9, 787-795 (2007).

Johnson, C.S. et al., The Significance of the Li2MnO3 Component In 'Composite' xLi2MnO3.(1-x)LiMn0.5Ni0.5O2 Electrodes, Electrochemistry Communications 6, 1085-1091 (2004).

Kang, S.H. et al., Layered Li(Li0.2Ni0. 15+0.5zCo0.10Mn0.55-0.5z)O2-zFz Cathode Materials for Li-ion Secondary Batteries, Journal of Power Sources 146, 654-657, (2005).

Kang, S.H. et al., Stabilization of xLi2MnO3.(1-x)LiMO2 Electrode Surfaces (M=Mn, Ni, Co) with Mildly Acidic, Fluorinated Solutions, Journal of The Electrochemical Society, 155 (4), A269-A275, (2008).

Kang, S.H. et al., The Effects of Acid Treatment on the Electrochemical Properties of 0.5 Li2MnO3.0.5 LiNi0.44Co0.25Mn0.31O2 Electrodes in Lithium Cells, Journal of The Electrochemical Society, 153 (6), A1186-A1192, (2006).

Kim, D et al., Composite 'Layered-Layered-Spinel' Cathode Structures for Lithium-Ion Batteries, Journal of The Electrochemical Society 160 (1), A31-A38 (2013).

Kim, J.S. et al., The Electrochemical Stability of Spinel Electrodes Coated with ZrO2, Al2O3, and SiO2 From Colloidal Suspensions, Journal of The Electrochemical Society 151 (10), A1755-A1761 (2004).

(56) References Cited

OTHER PUBLICATIONS

Kim, J. et al., Electrochemical and Structural Properties of xLi2M'O3 • (1-x)LiMn0.5Ni0.5O2 Electrodes for Lithium Batteries (M' = Ti, Mn, Zr; 0≤ x ≤ 0.3), Chemical Materials 16, 1996-2006 (2004).

Kim, D. et al., High-Energy and High Power Li Rich Nickel Manganese Oxide Electrode Materials, Electrochemistry Communications 12, 1618-1621 (2010).

Kim, J. et al., Controlled Nanoparticle Metal Phosphates (Metal = Al, Fe, Ce, and Sr) Coatings on LiCoO2 Cathode Materials, Journal of The Electrochemical Society 152 (6), A1142-A1148 (2005).

Kim, G.H., et al. Improvement of High-Voltage Cycling Behavior of Surface-Modified Li[Ni1/3Co1/3Mn1/3]O2 Cathodes by Fluorine Substitution for Li-Ion Batteries, Journal of The Electrochemical Society 152 (9), A1707-A1713, (2005).

Lee, E. S. et al., Understanding the Effect of Synthesis Temperature on the Structural and Electrochemical Characteristics of Layered-Spinel Composite Cathodes for Lithium-Ion Batteries, Journal of Power Sources 240, 193-203 (2013).

Lee, E. et al., Exploring Lithium-Cobalt-Nickel Oxide Spinel Electrodes For > 3.5 V Li-Ion Cells, ACS Applied Materials & Interfaces 8, 27720-27729 (2016).

Long, B.R. et al., Advances in Stabilizing 'Layered-Layered' xLi2MnO3 (1-x)LiMO2 (M=Mn, Ni, Co) Electrodes with a Spinel Component, Journal of The Electrochemical Society 161 (14), A2160-A2167 (2014).

Nam, K-W et al., In Situ X-ray Diffraction Studies of Mixed LiMn2O4-LiNi1/3Co1/3Mn1/3O2 Composite Cathode in Li-Ion Cells During Charge-Discharge Cycling, Journal of Power Sources 192, 652-659 (2009).

Park, B.C. et al., Improvement of Structural and Electrochemical Properties of AlF3-Coated Li[Ni1/3Co1/3Mn1/3]O2 Cathode Materials on High Voltage Region, Journal of Power Sources 178, 826-831 (2008).

Park, S-H. et al., Lithium-Manganese-Nickel-Oxide Electrodes with Integrated Layered-Spinel Structures for Lithium Batteries, Electrochemistry Communications 9, 262-268 (2007).

Sun, Y. K. et al., AlF3-Coating to Improve High Voltage Cycling Performance of Li[Ni1/3Co1/3Mn1/3]O2 Cathode Materials For Lithium Secondary Batteries, Journal of The Electrochemical Society 154 (3), A168-A172 (2007).

Thackeray, M., The Need For New Lithium-Ion Battery Materials, The 25th International Battery Seminar & Exhibit, Fort Lauderdale, Florida, Mar. 2008.

Thackeray, M.M. et al., Integrated Electrode Structures for Lithium-Ion Batteries, International Workshop on Fundamentals of Lithium-Based Batteries, Schloss Ringberg, Tegernsee, Germany, Nov. 2008.

Thackeray, M.M. et al., Advances in Manganese-Oxide 'Composite' Electrodes for Lithium-Ion Batteries, Journal of Materials Chemistry 15, 2257-2267 (2005).

Thackeray, M.M., Structural Considerations of Layered and Spinel Lithiated Oxides for Lithium Ion Batteries, Journal of The Electrochemistry Society 142 (8), 2558-2563 (1995).

Thackeray, M.M. et al., Li2MnO3-Stablized LiMO2 (M=Mn, Ni, Co) Electrodes for Lithium-Ion Batteries, Journal of Materials Chemistry 17, 3112-3125 (2007).

Van Der Ven, A. et al., Ordering in Lix(Ni0.5Mn0.5)O2 and Its Relation to Charge Capacity and Electrochemical Behavior In Rechargeable Lithium Batteries, Electrochemistry Communications 6, 1045-1050 (2004).

Ward, R.M. et al., Olivine Composite Cathode Materials For Improved Lithium Ion Battery Performance, U.S. Department of Energy, Journal of Undergraduate Research, vol. 6 (91), 2006.

Winter et al., What are Batteries, Fuel Cells and Supercapacitors? Chemical Reviews 104, 4245-4269 (2004).

Wu, Y. et al., Surface Modification of High Capacity Layered Li[Li0.2Mn0.54Ni0.13Co0.13]O2 Cathodes by AlPO4, Journal of The Electrochemical Society 155 (9), A635-A641, (2008).

Yang, J. et al., Synthesis and Characterization of Carbon-Coated Lithium Transition Metal Phosphates LiMPO4 (M=Fe, Mn, Co, Ni) Prepared Via A Nonaqueous Sol-Gel Route, Journal of The Electrochemical Society 153 (4), A716-A723 (2006).

Yang, J et al., Intergrown LiNi0.5Mn1.5O4.LiNi1/3Co1/3Mn1/3O2 Composite Nanorods as High-Energy Density Cathode Materials for Lithium-Ion Batteries, Journal of Materials Chemistry A, 1, 13742-13745 (2013).

Thackeray, M. M., Spinel Electrodes For Lithium Batteries, Journal of the American Ceramic Society, vol. 82 (12), 3347-3354 (1999).

Thackeray, M.M., Lithium Insertion Into Manganese Spinels, Mat. Res. Bull., vol. 18, 461-472 (1983).

* cited by examiner

DISORDERED ROCK SALT ELECTRODES FOR LITHIUM BATTERIES

CROSS REFERENCE TO RELATED APPLICATIONS

This application is division of U.S. application Ser. No. 16/233,369 filed on Dec. 27, 2018, which is a continuation-in-part of U.S. application Ser. No. 15/793,577 filed on Oct. 25, 2017, which claims the benefit of U.S. Provisional Application No. 62/514,086 filed on Jun. 2, 2017, each of which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials for lithium electrochemical cells and batteries. Such cells and batteries are used widely to power numerous devices, for example, portable electronic appliances and medical, transportation, aerospace, and defense systems.

BACKGROUND

State-of-the-art lithium batteries do not provide sufficient energy to power electric vehicles for an acceptable driving range. This limitation arises because the electrodes, both the anode, typically graphite, and the cathode, typically layered $LiMO_2$ (in which M is a metal cation, for example, Mn, Co, Ni or a combination thereof), spinel $LiMn_2O_4$ and olivine $LiFePO_4$ materials do not provide a sufficiently high cell capacity or voltage to meet the energy demands. Approaches that are currently being adopted to enhance the energy of lithium-ion batteries include the exploitation of composite cathode structures that can be formulated in terms of two layered components, $wLi_2MnO_3 \cdot (1-w)LiMO_2$ (in which M is typically Mn, Ni, Co or a combination thereof; and $0<w<1$), which offer a significantly higher capacity compared to conventional layered, spinel and olivine cathode materials. Such composite structures are often referred to as 'layered-layered' materials.

Lithium-rich and manganese-rich high capacity cathodes, such as $wLi_2MnO_3 \cdot (1-w)LiMO_2$ ($0<w<1$; M=Mn, Ni, Co) materials suffer from 'voltage fade' on repeated cycling, which reduces the energy output and efficiency of the cell, thereby compromising the management of cell/battery operation. Relative to nickel-rich $LiMO_2$ (M=Ni, Mn, and Co, often referred to as 'NMC') electrodes, manganese-rich electrodes are more attractive from the viewpoint of being lower cost and safer materials. Advances have been made by adding a third (spinel) component to lithium- and manganese-rich 'layered-layered' electrodes, such as a lithium-manganese-oxide spinel in a system $Li_{1+a}Mn_{2-a-b}M_bO_4$, as highlighted by Long et al. in the *Journal of the Electrochemical Society*, Volume 161, pages A2160-2167 (2014).

Another spinel-related electrode of interest is the lithiated lithium-cobalt-oxide spinel material, $Li_2Co_2O_4$ (alternatively, $LiCoO_2$), which has a rock salt stoichiometry. $Li_2Co_2O_4$ can be synthesized at a relatively low temperature (LT), for example, between 40° and 500° C. as first disclosed by Gummow et al. in the *Materials Research Bulletin*, Volume 27, pages 327-337 (1992) and in subsequent papers. Lithiated lithium-cobalt-oxide spinel materials such as $Li_2Co_2O_4$ produced at these temperatures are commonly referred to as "low temperature-$Li_2Co_2O_4$," or "LT-$Li_2Co_2O_4$" (alternatively, LT-$LiCoO_2$; where "LT" stands for "low temperature"). Similarly, stoichiometric lithium-cobalt-oxide spinel produced at low temperature is referred to as LT-$LiCo_2O_4$ (alternatively, LT-$Li_{0.5}CoO_2$). LT-$LiCo_2O_4$ can be derived, for example, by chemical or electrochemical extraction of lithium from LT-$Li_2Co_2O_4$. Lithiated cobalt-based spinel oxide materials, such as LT-$Li_2Co_2O_4$, and lithiated Ni-substituted derivatives such as LT-$Li_2(Co_{1-x}Ni_x)_2O_4$ ($0<x\leq0.5$), for example, LT-$Li_2Co_{1.8}Ni_{0.2}O_4$ (x=0.1), alternatively LT-$LiCo_{0.9}Ni_{0.1}O_2$, as disclosed by Gummow et al. in *Solid State Ionics*, Volumes 53-56, pages 681-687 (1992), are particularly attractive materials for lithium battery application relative to stoichiometric spinel materials, such as $LiMn_2O_4$ ($Li_{0.5}MnO_2$) or $LiCo_2O_4$, because the lithiated spinel oxide compounds have a rock salt stoichiometry and structure, like layered $LiMO_2$ and two-component $wLi_2MnO_3 \cdot (1-w)LiMO_2$ 'layered-layered' materials, which may facilitate structural integration of the layered and lithiated spinel components with one another at the atomic level.

The lithiated cobalt-based spinel oxide electrode materials defined above, which include the Ni-substituted derivatives (also referred to as "substituted" lithiated cobalt oxide), offer an attractive potential of approximately 3.6 V vs. metallic lithium over the compositional range $0\leq x\leq 0.5$ and $1\leq y\leq 2$ for Li, $(Co_{1-x}Ni_x)_2O_4$ (alternatively $Li_yCo_{1-x}Ni_xO_2$) over the compositional range $0\leq x\leq 0.5$ and $0.5\leq y\leq 1$, which is significantly higher than the potential of approximately 2.9 V that a corresponding lithium manganese-oxide system would offer. Furthermore, cobalt ions tend to have a lower solubility than manganese ions in the organic electrolyte solvents of lithium batteries. Moreover, relative to manganese and nickel ions, cobalt ions have a lower propensity to migrate during electrochemical $Co^{3+/4+}$ redox reactions of lithium-metal-oxide electrodes at high potentials, thereby offering the possibility of mitigating voltage fade of high capacity $wLi_2MnO_3 \cdot (1-w)LiMO_2$ electrodes by embedding a lithiated cobalt spinel component, as disclosed by Lee et al. in *Applied Materials & Interfaces*, Volume 8, pages 27720-27729 (2016). Nevertheless, despite these advantages, a distinct shortcoming of these lithiated and electrochemically delithiated cobalt-based spinel oxide electrodes (Li, $(Co_{1-x}Ni_x)_2O_4$ for $0\leq x\leq 0.5$ and $1\leq y\leq 2$), which prevents their use in practical lithium cells and batteries, is that they suffer from structural instability and decay when repeatedly charged and discharged, which leads to a poor cycle life and a loss of capacity and energy of the cells and batteries. There is therefore a need to improve the electrochemical stability and performance of lithiated cobalt-based spinel oxide materials for use as cathodes in lithium-ion batteries. The materials described herein address this need.

SUMMARY OF THE INVENTION

The materials described herein relate specifically to advances that have been made in the compositional design and electrochemical stability of lithiated cobalt-based spinel oxide materials, such as $Li_2(Co_{1-x}Ni_x)_2O_4$ in which $0\leq x\leq 0.5$, and particularly for use in a new generation of stabilized 'layered-layered-spinel' composite electrode structures in which a stabilized, lithiated cobalt-based spinel oxide component is integrated or embedded within a 'layered-layered' $wLi_2MnO_3 \cdot (1-w)LiMO_2$ component. Broadly speaking, the cation-stabilized lithium-cobalt-oxide spinel electrode materials in their discharged state, have, in lithiated spinel notation, the general formula $Li_2(Co_{1-x}Ni_x)_{2-2z}M'_{2z}O_4$ ($0 \leq x \leq 0.5$; $0 < z \leq 0.5$), alternatively $Li(Co_{1-x}Ni_x)_{1-z}M'_zO_2$ ($0 \leq x \leq 0.5$; $0 < z \leq 0.5$) in which the Co, Ni and M'ions together have an average trivalent state. Note that the substitution of one or more aliovalent cations M', such as divalent Mg or tetravalent Ti for trivalent Co and/or Ni may create oxygen vacancies or cation vacancies, respectively, for charge compensation in these structures. As is known in the art, aliovalent substitution is where the ion that is substituting the original ion is of a different oxidation state than the ion it is replacing.

Aliovalent substitutions change the overall charge within the ionic compound, but since the ionic compound must be neutral, the change in charge is compensated other adjustments in the elemental stoichiometry.

Alternatively, charge compensation can be accomplished by changes to the oxidation state of the Co and Ni cations. In general, when there are oxygen or cation vacancies in the electrode structure, the charge-compensated formulae can be represented as $Li_2(Co_{1-x}Ni_x)_{2-2z}M'_{2z}O_{4-\delta}$ and $Li_2(Co_{1-x}Ni_x)_{2-2z}M'_{2z}O_{4+\delta}$, respectively, in which δ is typically less than or equal to 0.2, and preferably less than or equal to 0.1. In practice, however, it is extremely difficult to determine precisely the number of oxygen or cation vacancies per formula unit in these materials. For convenience, therefore, the formula $Li_2(Co_{1-x}Ni_x)_{2-2z}M'_{2z}O_4$ (or alternatively written as $Li(Co_{1-x}Ni_x)$ $1\text{-}2M'2O2$) is used to cover the composition and stoichiometry of the materials, as defined above. The lithiated cobalt and nickel spinel materials described herein include electrochemically charged, lithium deficient electrodes derived from $Li_2(Co_{1-x}Ni_x)_{2-2z}M'_{2z}O_4$, i.e., $Li_y(Co_{1-x}Ni_x)_{2-2z}M'_{2z}O_4$ (or alternatively $Li_{y/2}(Co_{1-x}Ni_x)_{1-z}M'_zO_2$) at least over the range $1 \leq y \leq 2$ and within the range $0 \leq y \leq 2$ depending on the selection of M' and the values of x and z. Ideally, when y=2, the $Li_2(Co_{1-x}Ni_x)_{2-2z}M'_{2z}O_4$ material has a lithiated spinel structure with a rock salt stoichiometry in which M' is selected from one or more metal cations (e.g., Al, Ga, Mg, Ti, and the like).

In principle, the structural integration of two materials, each having a rock salt stoichiometry and being structurally compatible with one another, such as a lithiated spinel oxide component, e.g., $Li_2(Co_{1-x}Ni_x)_{2-2z}M'_{2z}O_4$, and a layered component, e.g., $wLi_2MnO_3 \cdot (1-w)LiMO_2$ where $0 < w < 1$ (e.g., M=Ni, Mn, Co) would appear to be more feasible than the structural integration of components having two different structure types, such as (i) a stoichiometric rock salt component in which all the octahedral sites are occupied and (ii) a stoichiometric spinel component in which one-half of the octahedral sites and one-eighth of the tetrahedral sites are occupied, the structure of the spinel component therefore containing a significantly higher number of cation defects than the structure of the rock salt component.

The cation-stabilized materials and compositions of formula $Li_2(Co_{1-x}Ni_x)_{2-2z}M'_{2z}O_4$ described herein suppress the structural and electrochemical instability of state-of-the art lithiated cobalt-based spinel oxide electrodes such as $Li_2(Co_{1-x}Ni_x)_2O_4$. In a preferred embodiment, M' is selected from one or more stabilizing cations, preferably a trivalent cation such as $Al^{3+}$ or $Ga^{3+}$, or a divalent cation such as $Mg^{2+}$, or a tetravalent cation such as $Ti^{4+}$ and/or $Zr^{4+}$, the divalent cation being optionally used in conjunction with a tetravalent ion. Preferably, the range of z is $0 < z \leq 0.5$, more preferably $0 < z \leq 0.4$, and most preferably $0 < z \leq 0.2$, whereas the range of x is preferably $0 \leq x \leq 0.5$, more preferably $0 \leq x \leq 0.3$, and most preferably $0 \leq x \leq 0.2$.

The stabilized, lithiated cobalt-based spinel oxide materials described herein are attractive as positive electrodes for lithium batteries in their own right. Additionally, these materials can be used as a structural component to stabilize a layered metal oxide electrode, or a two-component 'layered-layered' metal oxide electrode such as a $wLi_2MnO_3 \cdot (1-w)LiMO_2$ (e.g., $0 < w < 1$; M=Mn, Ni, Co) electrode material as taught in the art, for example by Thackeray et al. in the *Journal of Materials Chemistry*, Volume 17, pages 3053-3272 (2007), or a multi-component system containing one or more layered or spinel components, such as a 'layered-layered-spinel' system. In addition, the M'-substituted materials, particularly those containing trivalent Al and/or Ga ions and/or divalent Mg ions, have utility in stabilizing the surface of metal oxide electrodes, such as those with layered, spinel and olivine structure types.

In practice, these two-component or multi-component composite structures tend to be highly complex and are not single phase. The structures are inhomogeneous, their inhomogeneity being induced, for example, by cation disorder and they can comprise regions, for example, with layered character, spinel character, or intermediate layered-spinel character. The structures can also contain regions with stacking faults, yielding complex cation arrangements in the spinel and layered components and in the composite electrode structures overall. In addition, the stabilized lithiated cobalt-based spinel oxide materials may be cation- or anion deficient, or both, leading to deviations from the ideal stoichiometry defined by the formula $Li_2(Co_{1-x}Ni_x)_{2-2z}M'_{2z}O_4$.

BRIEF DESCRIPTION OF THE DRAWINGS

The materials described herein comprise certain novel features and advantages, some of which are illustrated in the following drawings. It is to be understood that various changes in the details of the materials described herein may be made without departing from the spirit, or sacrificing any of the advantages of the present materials. In these figures, a standard unsubstituted lithiated cobalt oxide spinel, $Li_2Co_2O_4$, i.e., $Li_2(Co_{1-x}Ni_x)_{2-2z}M'_{2z}O_4$ in which x=0 and z=0, which acts as a reference is referred to as $LiCoO_2$. The M'-substituted materials are referred to as $Li(Co_{1-x}Ni_x)_{1-z}M'_2O_2$ (x>0, z>0) or $LiCo_{1-z}M'_2O_2$ (x=0, z>0) for simplicity and convenience.

DETAILED DESCRIPTION OF PREFERRED EMBODIMENTS

Figure 1:
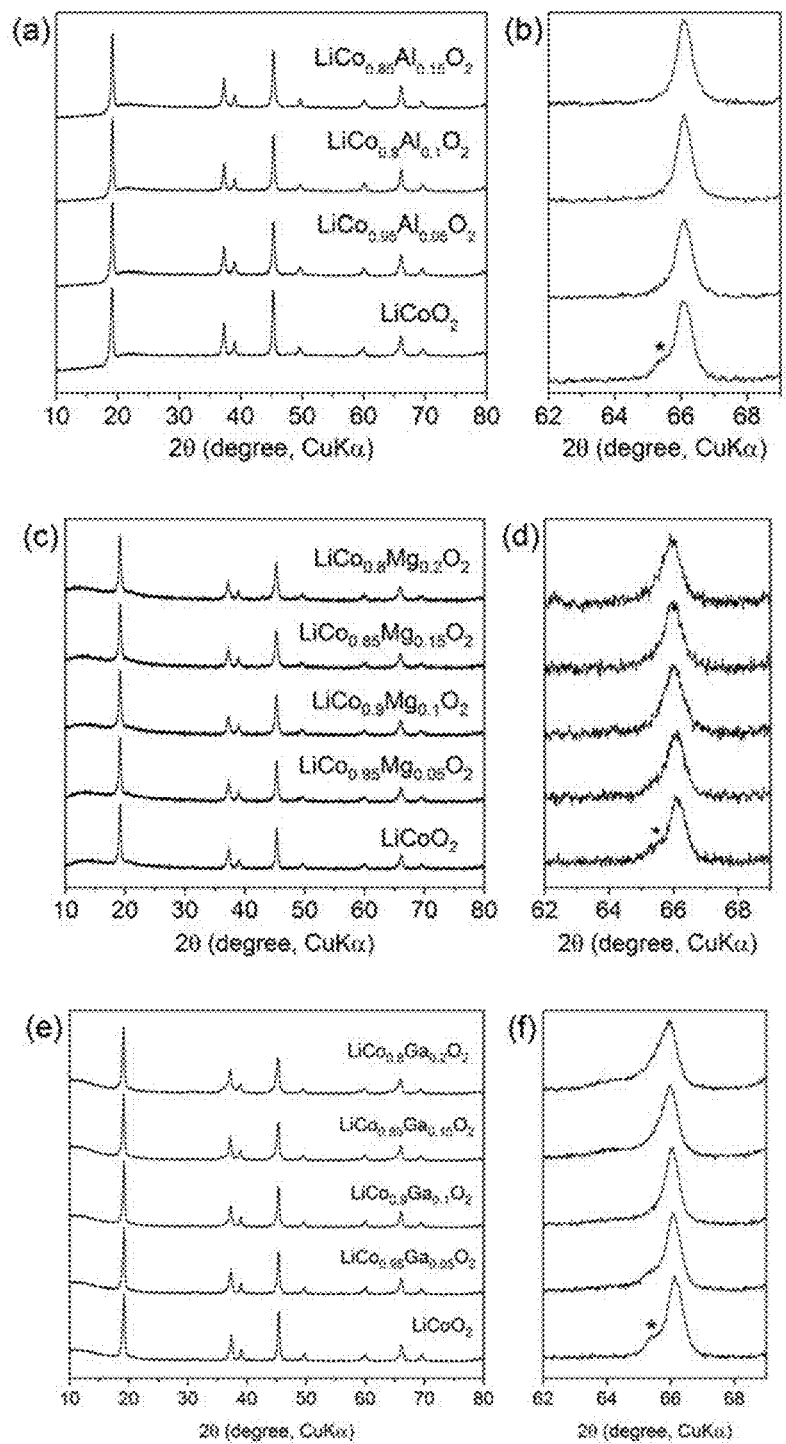
FIG. 1 depicts the powder X-ray diffraction patterns of (a) $LiCo_{1-z}Al_zO_2$ for x=0 and z=0 (reference; i.e., $LiCoO_2$), z=0.05, z=0.10 and z=0.15; (b) corresponding magnified regions of the (440) peak; (c) $LiCo_{1-z}Mg_zO_2$ for x=0 and z=0 (reference, i.e., $LiCoO_2$), z=0.05, z=0.10 and z=0.15; and (d) corresponding magnified regions of the (440) peak; (e) $LiCo_{1-z}Ga_zO_2$ for x=0 and z=0 (reference, i.e., $LiCoO_2$), z=0.05, z=0.10, z=0.15, and z=0.20; and (f) corresponding magnified regions of the (440) peak.

The stabilized lithiated cobalt-based spinel oxide electrode materials described herein can be represented in their ideal lithiated (rock salt) state by the general formula $Li_2(Co_{1-x}Ni_x)_{2-2z}M'_{2z}O_4$, in which M' is selected from one or more stabilizing multivalent cations, preferably one or more cation selected from a trivalent cation (e.g., $Al^{3+}$, $Ga^{3+}$), a divalent cation (e.g., $Mg^{2+}$), and a tetravalent cation (e.g., $Ti^{4+}$, $Mn^{4+}$, $Zr^{4+}$). Optionally, a divalent cation can be used in conjunction with a tetravalent ion. Preferably, the range of z is $0<z\leq0.5$, more preferably $0<z\leq0.4$, and most preferably $0<z\leq0.2$, whereas the range of x is preferably $0\leq x\leq0.5$, more preferably $0\leq x\leq0.3$, and most preferably $0\leq x\leq0.2$. These lithiated spinel materials can be used on their own as positive electrode materials for lithium batteries, or in combination, for example, with a layered or 'layered-layered' metal oxide material. The $Li_2(Co_{1-x}Ni_x)_{2-2z}M'_{2z}O_4$ material can be blended or physically mixed with one or more layered or spinel components, or they can be structurally integrated with one or more layered or spinel components to form two-component 'layered-spinel', three-component 'layered-layered-spinel', or multi-component 'layered-spinel' systems as defined by the phase diagram and compositional space of each system.

For example, the lithiated spinel of formula $Li_2(Co_{1-x}Ni_x)_{2-2z}M'_{2z}O_4$ can be structurally-integrated with a 'layered-layered' $wLi_2MnO_3\cdot(1-w)LiMO_2$ structure ($0<w<1$). As used herein, the terms "structurally-integrated" and "integrated" refer to a material with multiple different crystal domains of spinel and/or layered components sharing a common oxygen lattice within a given particle of the material, as opposed to materials that include layered and/or spinel structures that are merely physically combinations or mixtures of separately prepared particulate materials that are mixed together, optionally with a binder, to form an electrode material with separate particles of the different materials (e.g., spinel and layered materials) in close proximity or contact with each other. The structurally integrated materials of the invention include those in which structural integration occurs between components within the bulk of a particle and/or between components within the bulk and components at the surface of a particle.

In practice, the structures of the composite electrode materials described herein tend to be highly complex and may not be single phase. Typically, the structures are inhomogeneous, and the inhomogeneity can be induced, for example, by cation disorder. The structures can contain regions with layered or intermediate layered-spinel character and they can contain regions with stacking faults. The structural complexity and composition of these electrode materials, both local and across the particles, can be varied by varying the synthesis conditions used to prepare them, for example, the firing or annealing temperatures, dwell times and heating and/or cooling rates.

In an ideal layered $LiMO_2$ rock salt structure all the Li and M cations occupy octahedral sites within a close-packed oxygen array while all the tetrahedral sites are vacant. In contrast, in an ideal $LiM_2O_4$ spinel structure the Li ions occupy one-eighth of the available tetrahedral sites and the M cations one-half of the available octahedral sites. It is well known in the art that metal oxide materials can often contain a small fraction of cation or anion defects (i.e., vacant sites), for example at grain boundaries such that the formulae $LiMO_2$ and $LiM_2O_4$, may not be ideally stoichiometric. The substituted lithiated cobalt-based spinel oxide electrode materials described herein, $Li_2(Co_{1-x}Ni_x)_{2-2z}M'_{2z}O_4$ ($0\leq x\leq0.5$; $0<z\leq0.5$), alternatively $Li(Co_{1-x}Ni_x)_{1-z}M'_zO_2$ ($0\leq x\leq0.5$; $0<z\leq0.5$) can deviate from ideal stoichiometry, and can include some degree of structural disorder in the electrode materials in which the Li, Co and M cations are partially disordered and distributed over the octahedral and tetrahedral sites of the layered and spinel components of the lithium metal oxide structure to form, e.g., a lithiated spinel configuration, a layered configuration, or an intermediate layered-spinel configuration. Such disordered integrated structural arrangements can also be found in the delithiated electrode structures when they are partially or fully charged.

The materials described herein are cation-stabilized materials and compositions that suppress the structural and electrochemical instability of lithiated cobalt spinel oxide ($Li_2Co_2O_4$) and lithiated Ni-substituted derivatives known in the art, such as LT-$Li_2(Co_{1-x}Ni_x)_2O_4$ ($0<x\leq0.5$) electrodes for lithium batteries, notably lithium-ion batteries. In other aspects, the electrodes, electrochemical cells, and batteries that contain such stabilized lithiated cobalt-based spinel oxide electrodes are provided.

As used herein, the phrases "rock salt" and "rock salt stoichiometry" in reference to metal oxide materials, refer to material with structures having a 1:1 atom ratio of metal ions to oxygen, e.g., as in $LiCoO_2$, or $Li_2Mn_2O_4$, and the like.

The term "spinel" as used herein in reference to metal oxide materials refers to a material having a spinel-type crystal structure. The prototype "spinel" is the mineral $MgAl_2O_4$. As explained in Thackeray, *J. Am. Ceram. Soc*; 1999; 82, 3347-54, spinels have a generic structure $A[B_2]X_4$ where A refers to cations in the 8a tetrahedral sites and B refers to cations in the 16d octahedral sites of the cubic space group symmetry $Fd\bar{3}m$ (sometimes written as Fd-3m or simply Fd3m in older literature due to the difficulty of typing a macron over the number 3). The X anions, such as oxygen anions, located at the 32e sites form a cubic-close-packed array. Thus, the prototypical spinel can be written in the following form, which identifies the sites of the various cations a within the spinel crystal structure: $(A)_{8a}[B_2]_{16d}O_4$ (i.e., $X=O$) where the square brackets delineate crystallographically independent octahedral sites. There are 64 tetrahedral sites in a typical unit cell, one eighth of which are occupied by the A cations, and 32 octahedral sites, one half of which are occupied by the B cations within the unit cell. Lithium ions can be inserted into a spinel structure to form a product with rock salt stoichiometry, and which has a structure, referred to as a "lithiated spinel", of formula $LiAB_2O_4$, alternatively $[LiA]_{16c}[B_2]_{16d}O_4$, i.e., in which the A cations are displaced from tetrahedral 8a sites of the normal spinel structure to octahedral 16c sites along with the added lithium.

Layered lithium-cobalt-oxide with $R\bar{3}m$ symmetry, HT-$LiCoO_2$, is a well-known cathode material for lithium batteries; and is synthesized at high temperature (HT), typically about 900° C. Approximately one-half of the lithium ions can be electrochemically extracted from the structure at an average voltage of approximately 4 V vs. lithium metal in a reversible, single-phase process before the onset of structural instabilities. When synthesized at 400° C., 'low-temperature' $LiCoO_2$ (LT-$LiCoO_2$) adopts a cubic, lithiated-spinel configuration with a rock salt stoichiometry: $[Li_2]_{16c}[Co_2]_{16d}O_4$, in which the lithium and cobalt ions reside ideally on the octahedral 16c and 16d sites, respectively, of the prototypic spinel space group $Fd\bar{3}m$. Like layered HT-$LiCoO_2$, approximately one-half of the lithium can be removed from the lithiated spinel $[Li_2]_{16c}[CO_2]_{16d}O_4$. In this case, the reaction occurs at approximately 3.5 V vs. metallic lithium as a two-phase process that generates the spinel structure $(Li)_{8a}[CO_2]_{16d}O_4$ (also with $Fd\bar{3}m$ symmetry) in which the lithium ions occupy the tetrahedral 8a sites. Further delithiation at higher potential has proven to be difficult. Similar two-phase behavior has been observed for the nickel-substituted lithiated spinel electrodes LT-$Li_2[CO_{2-2x}Ni_{2x}]O_4$ or, more simply, LT-$LiCo_{1-x}Ni_xO_2$.

The unsubstituted and substituted lithiated spinels LT-$LiCoO_2$ and LT-$LiCo_{1-x}Ni_xO_2$, respectively, both operate as zero-strain electrodes because there is only a small change to the "a" lattice parameter when lithium is extracted from their structures. As used herein, the term "substituted" in reference to a lithium cobalt oxide material refers to replacement of a portion of the cobalt by another metal. Such electrode materials are attractive because they offer the possibility of minimizing structural fatigue and allowing high charge and discharge rates during electrochemical cycling. As described herein, Al-substituted electrode materials, for example, LT-$Li_2(Co_{1-x}Ni_x)_{2-2z}Al_{2z}O_4$, alternatively written in crystallographic notation as $[Li_2]_{16c}[Co_{1.4}Al_{0.6}]_{16d}O_4$, for $x=0$ and $z=0.3$, operate with virtually no volume expansion during electrochemical charge and discharge and/or with partial or complete substitution of cobalt for aluminum on the 16c sites. Furthermore, these substituted electrodes provide significantly and surprisingly improved cycling stability and power relative to unsubstituted LT-$Li_2[CO_{2-2x}Ni_{2x}]O_4$. For example, $LiCo_{0.7}Al_{0.3}O_2$, (i.e., where $x=0$ in the foregoing formula), operates with virtually no volume expansion during electrochemical charge and discharge, and structural analysis of this electrode material has revealed that a small portion of the 16c sites, about 2 to 3%, are occupied by Al (and/or Co) in place of Li, thereby producing a novel disordered rock salt spinel structure, $[Li_{1.952}Al_{0.048}]_{16c}[Co_{1.4}Al_{0.552}Li_{0.048}]_{16d}O_4$.

This discovery reveals a new structural class of lithium-metal-oxide materials having a disordered rock salt structure with partial lithiated-spinel character. These new materials have a disordered rock salt structure that comprises a formula $Li_2(M''_{2-a}M'''_a)O_4$, and can be defined, in general, by the crystallographic formula: $[Li_{2-b}M'''_b]_{16c}[M''_{2-a}M'_{a-b}Li_b]_{16d}O_4$ where 16c and 16d refer to the octahedral sites of the prototypic space group symmetry $Fd\bar{3}m$; M'' and M''' are metal ions; $0<a\leq 0.5$; and $0<b<0.5$. In some embodiments, M'' is one or more metals selected from the group consisting of Co, Ni, Mn, V and Fe; M''' is one or more metals selected from the group consisting of Al, Ga, Mg and Ti. These principles also can be extended to include disordered rock salt structures with symmetry other than $Fd\bar{3}m$.

In some embodiments, the materials of formula $Li_2(M''_{2-a}M'''_a)O_4$ can have a structure that is either cation or anion deficient, or both. Optionally, the Li, M'' and M''' cations can be partially disordered over octahedral and tetrahedral sites of layered and spinel component structures.

In some embodiments, the cation-stabilized lithium cobalt oxide electrode material is structurally integrated with a two-component layered-layered material of formula: $wLi_2MnO_3\cdot(1-w)LiMO_2$, wherein M comprises one or more metal cations; and $0<w<1$ (e.g., where M comprises one or more cations selected from the group consisting of Ni, Mn, and Co). The Li, Co, Ni, Mn, M'' and M''' cations can be partially disordered over octahedral and tetrahedral sites of layered and spinel component structures.

In some embodiments, the $[Li_{2-b}M'''_b]_{16c}[M''_{2-a}M'''_{a-b}Li_b]_{16d}O_4$ can have $0<a-b<0.2$ (e.g., $0<a-b<0.1$; or $0<a-b<0.05$). Additionally, in some embodiments $0<a<0.3$, or $0<a<0.2$; or $0<a<0.1$. In some preferred embodiments, $0<a<0.3$ and $0<a-b<0.1$.

In a further embodiment, B represents preferably less than 50% of the non-lithium metal ions in the $[Li_{2-y}B_y]_{16c}[A_{2-x}B_{x-y}Li_y]_{16d}O_4$ structure, more preferably less than 30%, and most preferably less than 20%. In yet a further embodiment, the B cations occupy preferably less than 20% of the 16d sites in the $[Li_{2-y}B_y]_{16c}[A_{2-x}B_{x-y}Li_y]_{16d}O_4$ prototypic spinel structure, more preferably less than 10%, and most preferably less than 5%. The principles described above also can be extended to include disordered rock salt structures with symmetry other than $Fd\bar{3}m$.

The materials described herein can include surface treatments and coatings to protect from undesirable reactions with the electrolyte, for example, treatments or coating of metal-oxide, metal-fluoride or metal-phosphate materials to shield the electrodes from highly oxidizing charging potentials and from other undesirable effects, such as electrolyte oxidation, oxygen loss, and/or dissolution. Such surface protection enhances the surface stability, rate capability and cycling stability of the electrode materials.

In some embodiments, individual particles of a powdered lithium metal oxide composition, a surface of the formed electrode, or both, are coated or treated, e.g., in situ during synthesis, for example, with a metal oxide, a metal fluoride, a metal polyanionic material, or a combination thereof, e.g., at least one material selected from the group consisting of (a) lithium fluoride, (b) aluminum fluoride, (c) a lithium-metal-oxide in which the metal is selected preferably, but not exclusively, from the group consisting of Al and Zr, (d) a lithium-metal-phosphate in which the metal is selected from the group consisting preferably, but not exclusively, of Fe, Mn, Co, and Ni, and (e) a lithium-metal-silicate in which the metal is selected from the group consisting preferably, but not exclusively, of Al and Zr, and (f) a substituted lithium-cobalt-oxide of this invention, $Li_2(Co_{1-x}Ni_x)_{2-2z}M'_{2z}O_4$.

In a preferred embodiment, the constituents of the treatment or coating, such as the aluminum and fluoride ions of an $AlF_3$ coating, the lithium and phosphate ions of a lithium phosphate coating, the lithium, nickel and phosphate ions of a lithium-nickel-phosphate coating, or the lithium, cobalt, nickel and substituted ions of a $Li_2(Co_{1-x}Ni_x)_{2-2z}M'_{2z}O_4$ coating can be incorporated in a solution that is contacted with electrode precursor materials, or the electrode material to be coated. Alternatively, the surface of the electrode material may be treated with fluoride ions, for example, using $NH_4F$, in which case, the fluoride ions may substitute for oxygen at the surface or at least partially within the bulk of the electrode structure.

Preferably, a formed positive electrode comprises at least about 50 percent by weight (wt %) of a powdered lithium metal oxide composition comprising the lithium-rich spinel material, and an electrochemically inert polymeric binder (e.g., polyvinylidene difluoride; PVDF) coated on a metallic current collector (e.g., aluminum). Optionally, the positive electrode can comprise up to about 40 wt % carbon (e.g., carbon back, graphite, carbon nanotubes, carbon microspheres, carbon nanospheres, or any other form of particulate carbon).

The following examples are provided to illustrate certain features and aspects and are not to be construed as limiting the scope of any claims herein. In these examples, a standard unsubstituted lithiated cobalt oxide spinel, $Li_2Co_2O_4$, i.e., $Li_2(Co_{1-x}Ni_x)_{2-2z}M'_{2z}O_4$ in which x=0 and z=0, which acts as a reference, is referred to as $LiCoO_2$. M'-substituted $Li_2(Co_{1-x}Ni_x)_{2-2z}M'_{2z}O_{4-\delta}$ and $Li_2(Co_{1-x}Ni_x)_{2-2z}M'_{2z}O_{4-\delta}$ materials with cation and/or anion vacancies in which z>0, as defined herein, are referred to in normalized notation as $LiCo_{1-z}M'_zO_2$ (x=0) and $Li(Co_{1-x}Ni_x)_{1-z}M'_zO_2$ (x>0) for simplicity and convenience.

Example 1. Synthesis and Characterization of $LiCo_{1-z}M'_zO_2$ (M'=Al, Mg, Ga, Ti, Mn) Materials A parent, unsubstituted $LiCoO_2$ electrode material was prepared by a 'low-temperature' method reported previously by Gummow et al. in *Mat. Res. Bull.* 27, 327 (1992), and U.S. Pat. No. 5,160,712. Cation substituted materials $LiCo_{1-z}M'_zO_2$ (M'=Al, Mg, Ga; 0.05≤z≤0.2) were prepared by solid-state reaction of lithium carbonate ($Li_2CO_3$, >99%) and cobalt carbonate ($CoCO_3$·~0.3H$_2$O, >99%) precursors with either aluminum nitrate ($Al(NO_3)_3$·9H$_2$O, >99%), magnesium nitrate ($Mg(NO_3)_2$·6H$_2$O, >99%), or gallium nitrate ($Ga(NO_3)_3$·xH$_2$O, >99%) precursors. Stoichiometric amounts of the precursors were thoroughly mixed using a mortar and pestle, and fired in air at 400° C. for approximately 6 days. The heating rate was about 2° C. per min, and the samples were cooled in the furnace without controlling the cooling rate. FIG. 1 (*a*), shows the powder X-ray diffraction (XRD) patterns of the lithiated spinel samples, $LiCo_{1-z}Al_zO_2$, for z=0, 0.05, 0.1, and 0.15. All the XRD patterns could be indexed predominantly to a cubic unit cell consistent with a lithiated spinel structure. There was no apparent evidence of an Al impurity phase, such as $Al_2O_3$, in this product, indicating that the Al cations had been incorporated into the $LiCoO_2$ lithiated spinel lattice. Evidence of peak broadening and peak splitting in the XRD patterns, which was particularly noticeable for the unsubstituted $LiCoO_2$ sample, indicated that the lithiated spinel phase contained some layered character, which is not surprising given the well-known and strong tendency for $Co^{3+}$ and $Li^+$ to order in a layered $LiCoO_2$ configuration at higher temperatures. Localized layered domains in the lithiated spinel $LiCoO_2$ product synthesized at 400° C. clearly are evident by the broadening and splitting of the (440) peak, as shown in FIG. 1 (*b*). In contrast, the magnified (440) peak of the Al-substituted $LiCo_{1-z}Al_zO_2$ cathodes did not exhibit any significant peak splitting. This finding provides strong evidence that Al substitution effectively suppresses the layered ordering of the lithium and cobalt ions and that it stabilizes the spinel configuration in $LiCo_{1-z}Al_zO_2$ lithiated spinel cathode materials, at least those prepared at a relatively low temperature such as 400° C.

The X-ray diffraction patterns of the $LiCo_{1-z}Mg_zO_2$ samples (z=0, 0.05, 0.1, 0.15, 0.2) shown in FIG. 1 (*c*), are consistent with a lithiated spinel structure. For z=0.15 and 0.2, the onset of small peak at approximately 43° 2θ may be attributed to a small amount of MgO impurity. As for Al substitution, FIG. 1 (*d*), shows that Mg substitution suppresses lithium and cobalt layered ordering in the $LiCo_{1-z}Mg_zO_2$ lithiated spinel products.

FIG. 1 (*e*) shows the X-ray diffraction patterns of $LiCo_{1-z}Ga_zO_2$ samples (z=0, 0.05, 0.1, 0.15, and 0.2) that could be indexed to a lithiated spinel structure. FIG. 1 (*f*) indicates that the Ga substitution also suppresses layered Li/Co ordering.

Substituted lithiated cobalt spinel oxide materials, $Li(Co_{1-x}Ni_x)_{1-z}M'_zO_2$ (M'=Al, Ga, Mg, Ti, Mn; 0<x≤0.25; 0<z≤0.2), i.e., those containing nickel, were prepared by the same method as described above, using the appropriate amount of nickel nitrate ($Ni(NO_3)_2$·6H$_2$O) precursor required for a desired stoichiometry. For Ti or Mn substitution, $TiO_2$ nanopowder or $MnCO_3$ was used as the precursor, respectively.

Figure 2:
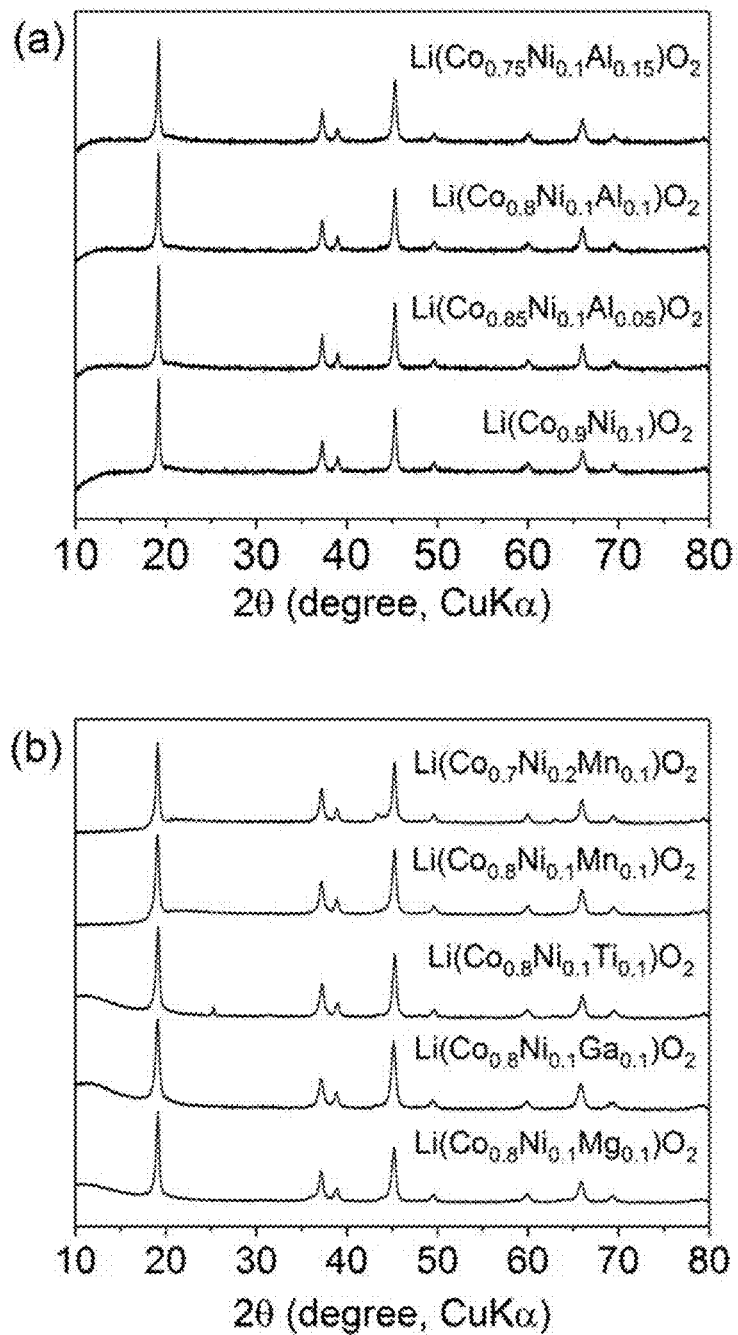
FIG. 2 depicts the powder X-ray diffraction patterns of (a) $LiCo_{1-z}Ni_zAl_\delta O_2$ ($0.1 \leq z \leq 0.25$; $0 \leq \delta \leq 0.15$); and (b) $LiCo_{1-z}Ni_zM'_\delta O_2$ M'=Mg, Ga, Ti, Mn ($0.1 \leq z \leq 0.25$; $0 \leq \delta \leq 0.15$).

X-ray diffraction patterns of the $Li(Co_{0.9-z}Ni_{0.1}Al_z)O_2$ materials (z=0, 0.05, 0.1, and 0.15) are shown in FIG. 2 (*a*). The patterns could be indexed to a lithiated spinel structure. As for $LiCo_{1-z}Al_zO_2$, there was no apparent evidence of Al and/or Ni impurity phases.

FIG. 2 (*b*) shows the X-ray diffraction patterns of $LiCo_{0.8}Ni_{0.1}M'_{0.1}O_2$ (M'=Mg, Ga, Ti, Mn) and $LiCo_{0.7}Ni_{0.2}M'_{0.1}O_2$ (M'=Mn). All the patterns could be indexed predominantly to a cubic lithiated spinel structure. The XRD pattern of the $LiCo_{0.8}Ni_{0.1}Ti_{0.1}O_2$ product indicates weak impurity peak at about 25° 2θ (CuKα), which is tentatively attributed to a $TiO_2$ impurity phase. The weak peak at about 44° 2θ in the XRD pattern of $LiCo_{0.7}Ni_{0.2}Mn_{0.1}O_2$ is attributed to a trace amount of NiO.

Example 2. Electrochemical Evaluations

Coin-type cells (2032, Hohsen) were constructed in an argon-filled glovebox (<5 ppm $O_2$ and $H_2O$). The cathode consisted of approximately 84 percent by weight (wt %) of $LiCo_{1-z}M'_zO_2$ powder, 8 wt % carbon, and 8 wt % polyvinylidene difluoride (PVDF) binder on aluminum foil. The anode was metallic lithium foil. The electrolyte was 1.2 M $LiPF_6$ in a 3:7 (w/w) mixture of ethylene carbonate and ethyl-methyl carbonate. For the cycling experiments, $Li/LiCo_{1-z}M_zO_2$ cells (M=Al and Mg) were galvanostatically charged and discharged between 2.5 and 4.2 V at a current rate of either approximately 15 mA/g or approximately 60 mA/g. Electrochemical experiments were conducted at about 30° C.

Figure 3:
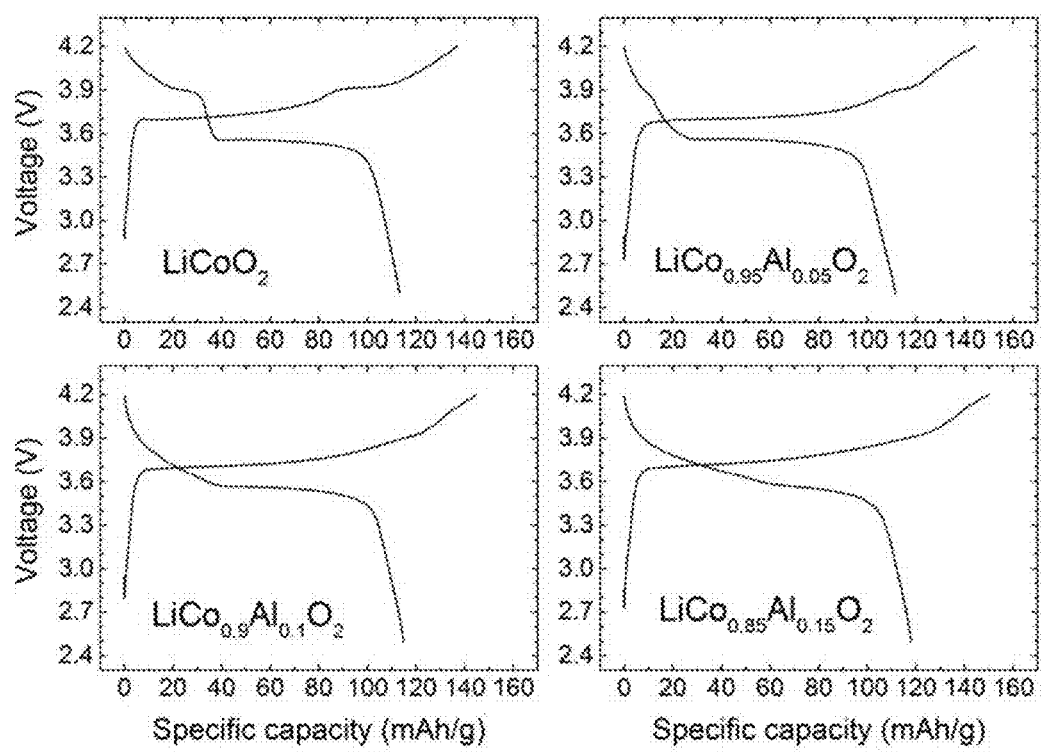
FIG. 3 depicts the initial charge and discharge voltage profiles of lithium cells with $LiCo_{1-z}Al_zO_2$ electrodes cycled at 15 mA/g between 2.5-4.2 V vs. Li.
Figure 4:
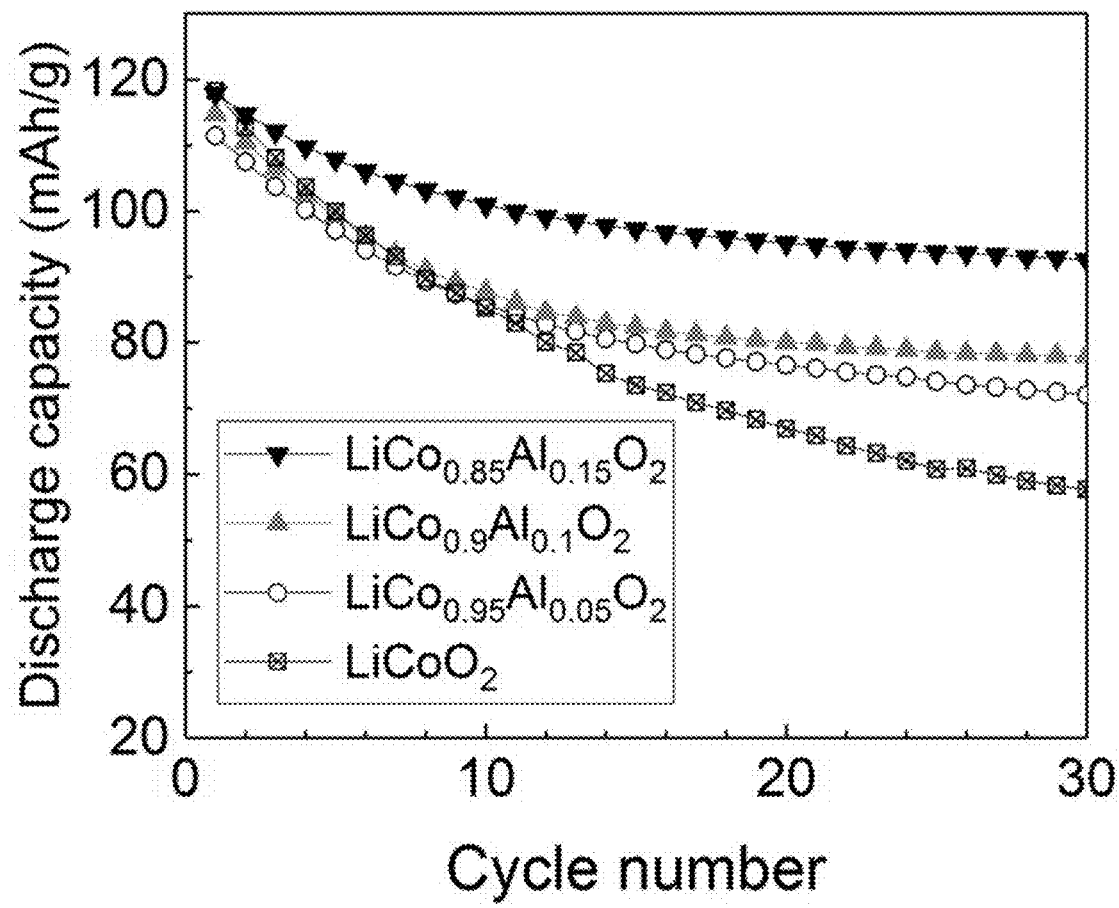
FIG. 4 depicts the electrochemical cycling performance of lithium cells with $LiCo_{1-z}Al_zO_2$ electrodes cycled at 15 mA/g between 2.5-4.2 V vs. Li.

FIG. 3 compares the voltage profiles of the $LiCo_{1-z}Al_zO_2$ lithiated spinel electrodes. With increasing Al content, the 3.9 V plateau that is attributed to local layered domains in lithiated spinel oxide particles disappears and instead, a smoothly sloping voltage profile develops. Such sloping voltage profiles exhibited by the Al-substituted $LiCo_{1-z}Al_zO_2$ lithiated spinel electrodes are advantageous for battery management because it is possible to monitor and estimate the state of charge (SOC) and depth of discharge (DOD) during the operation of practical lithium cells. Furthermore, FIG. 4 demonstrates the improved cycling stability of the Al-substituted $LiCo_{1-z}Al_zO_2$ lithiated spinel electrodes relative to an unsubstituted $LiCoO_2$ electrode, which is anticipated to be more pronounced when embedded in localized domains in layered $LiMO_2$ and 'layered-layered' $wLi_2MnO_3 \cdot (1-w)LiMO_2$ electrodes.

Figure 5:
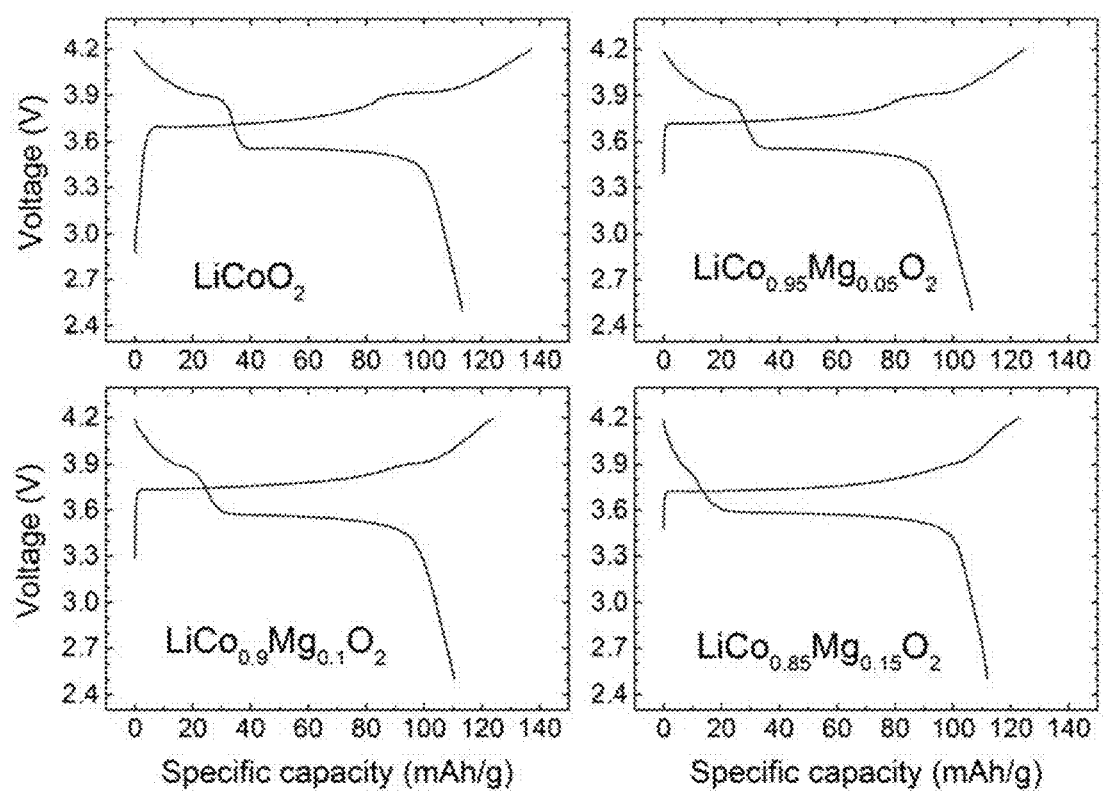
FIG. 5 depicts the initial charge and discharge voltage profiles of lithium cells with $LiCo_{1-z}Mg_zO_2$ electrodes cycled at 15 mA/g between 2.5-4.2 V vs. Li.
Figure 6:
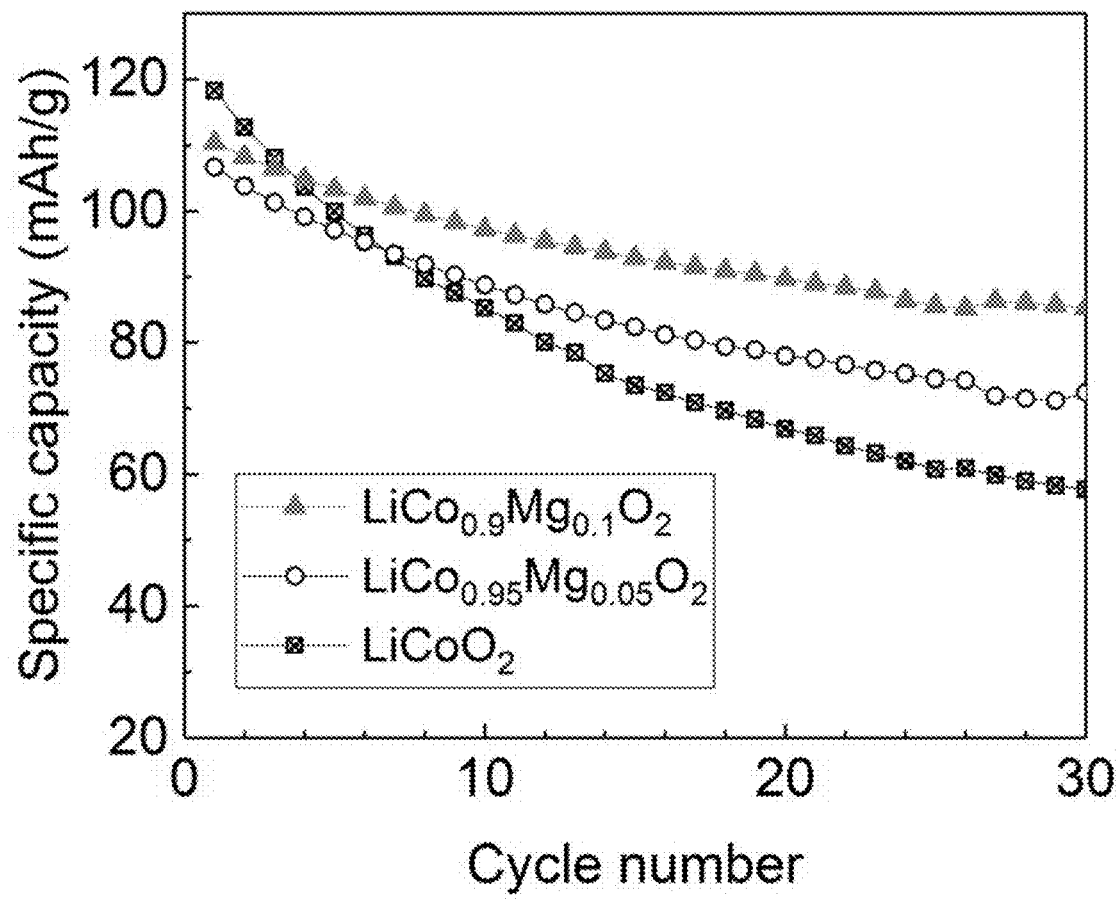
FIG. 6 depicts the electrochemical cycling performance of lithium cells with $LiCo_{1-z}Mg_zO_2$ electrodes cycled at 15 mA/g between 2.5-4.2 V vs. Li.

FIG. 5 compares the voltage profiles of the $LiCo_{1-z}Mg_zO_2$ lithiated spinel electrodes for z=0, 0.05, 0.10 and 0.15. As for Al-substituted electrodes, increasing Mg substitution shortens the length of the 3.9 V plateau, implying that the amount of the layered component in the $LiCo_{1-z}Mg_zO_2$ electrode decreases with increasing z, and that at z=0.15, the shape of the electrochemical profile is predominantly spinel-like in character. FIG. 6 demonstrates the improved cycling stability of Mg-substituted $LiCo_{1-z}Mg_zO_{2-\delta}$ electrodes relative to an unsubstituted $LiCoO_2$ electrode over 30 cycles.

Figure 7:
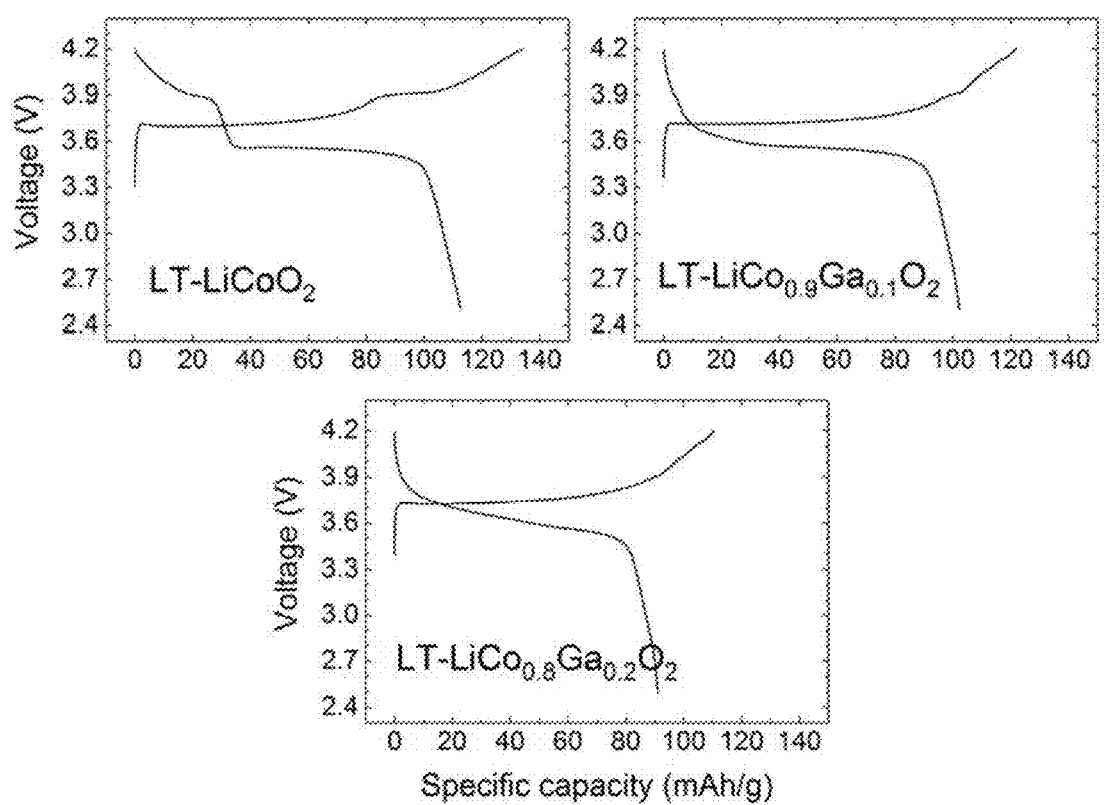
FIG. 7 depicts the initial charge and discharge voltage profiles of lithium cells with $LiCo_{1-z}Ga_zO_2$ electrodes cycled at 15 mA/g between 2.5-4.2 V vs. Li.
Figure 8:
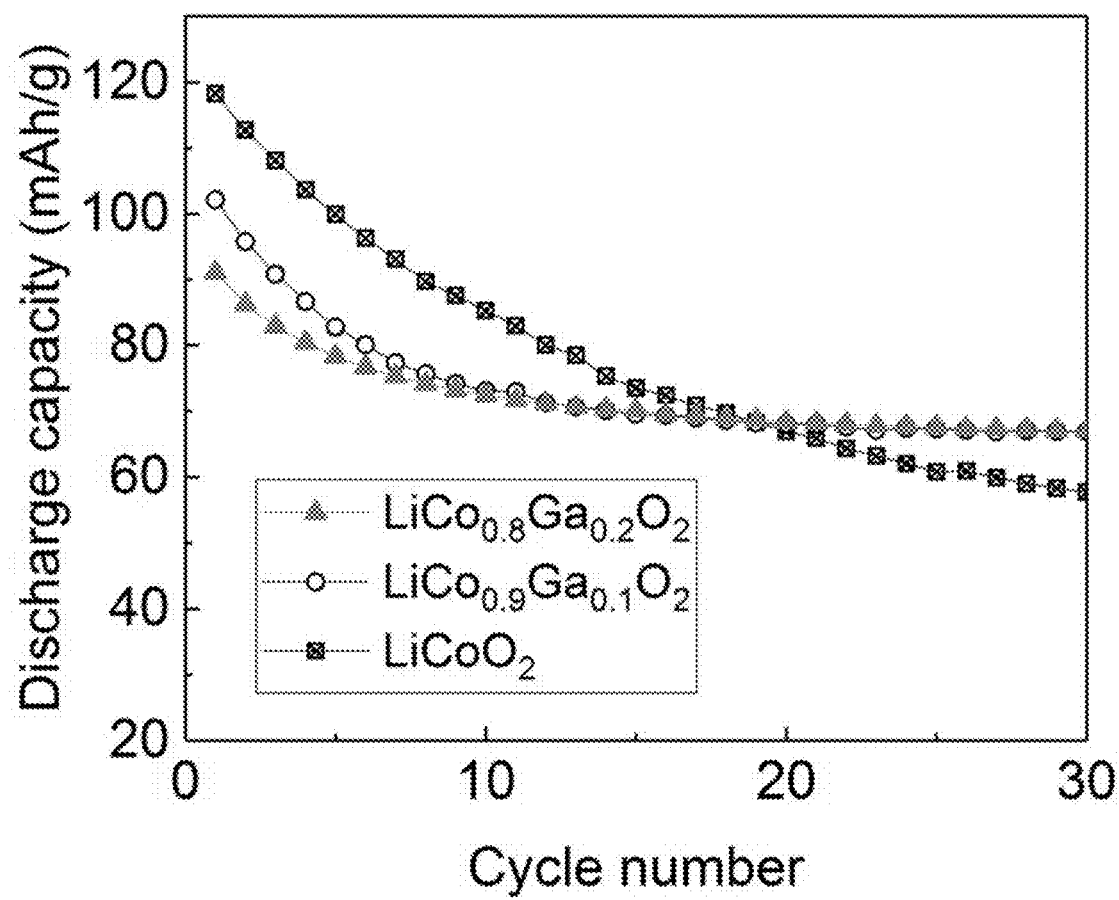
FIG. 8 depicts the electrochemical cycling performance of lithium cells with $LiCo_{1-z}Ga_zO_2$ electrodes cycled at 15 mA/g between 2.5-4.2 V vs. Li.

FIG. 7 compares the voltage profiles of the $LiCo_{1-z}Ga_zO_2$ lithiated spinel electrodes for z=0, 0.10 and 0.20. As for Al-substituted electrodes, increasing Mg substitution shortens the length of the 3.9 V plateau, and develops sloping voltage profiles. FIG. 8 demonstrates the improved cycling stability of Ga-substituted $LiCo_{1-z}Ga_zO_{2-\delta}$ electrodes relative to an unsubstituted $LiCoO_2$ electrode over 30 cycles.

Figure 9:
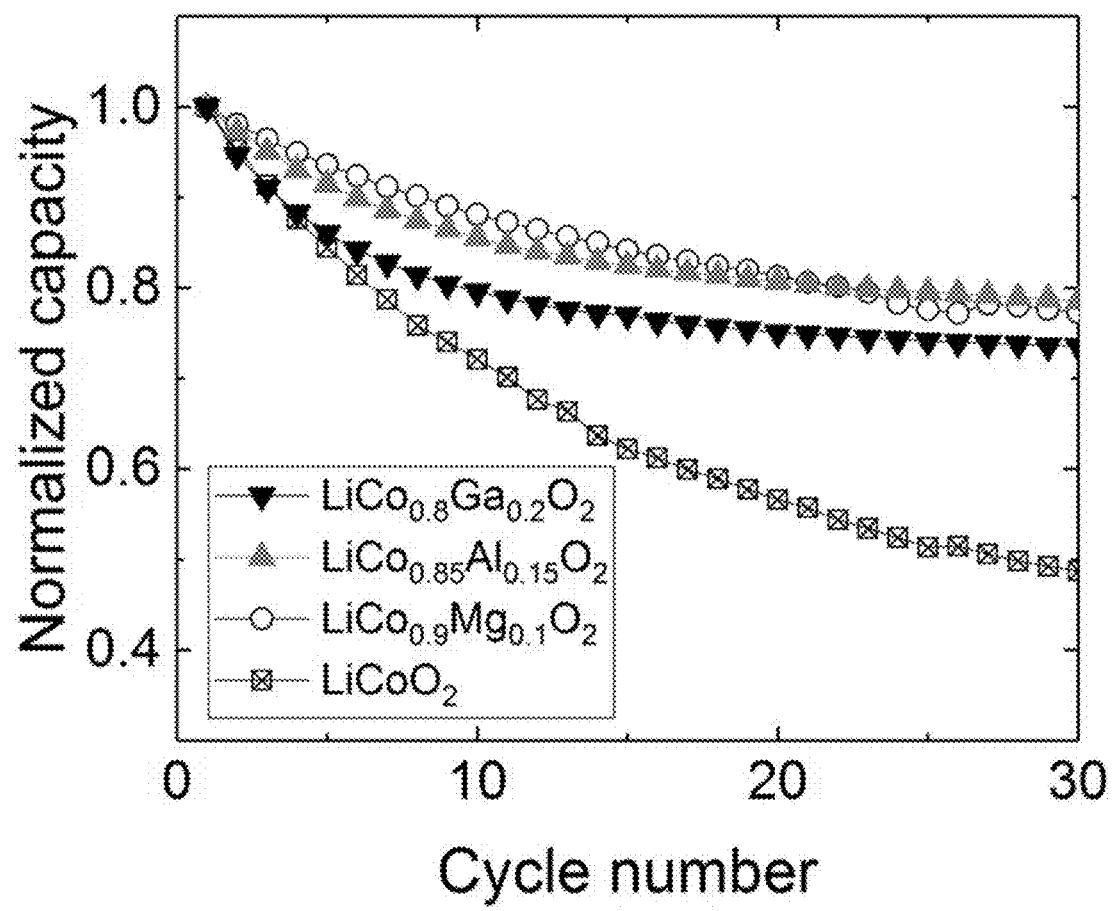
FIG. 9 depicts normalized specific capacity plots of $LiCoO_2$, $LiCo_{0.85}Al_{0.15}O_2$, $LiCo_{0.9}Mg_{0.1}O_2$ and $LiCo_{0.8}Ga_{0.2}O_2$ electrodes cycled at 15 mA/g between 2.5-4.2 V vs. Li.

FIG. 9 depicts the normalized specific capacity plots of lithium half cells with $LiCoO_2$, $LiCo_{0.9}Mg_{0.1}O_2$, $LiCo_{0.85}Al_{0.15}O_2$, and $LiCo_{0.8}Ga_{0.2}O_2$ electrodes cycled at 15 mA/g between 2.5-4.2 V vs. Li. The data highlight the superior cycling stability of materials substituted with Mg, Al, and Ga relative to an unsubstituted $LiCoO_2$ electrode material.

Figure 10:
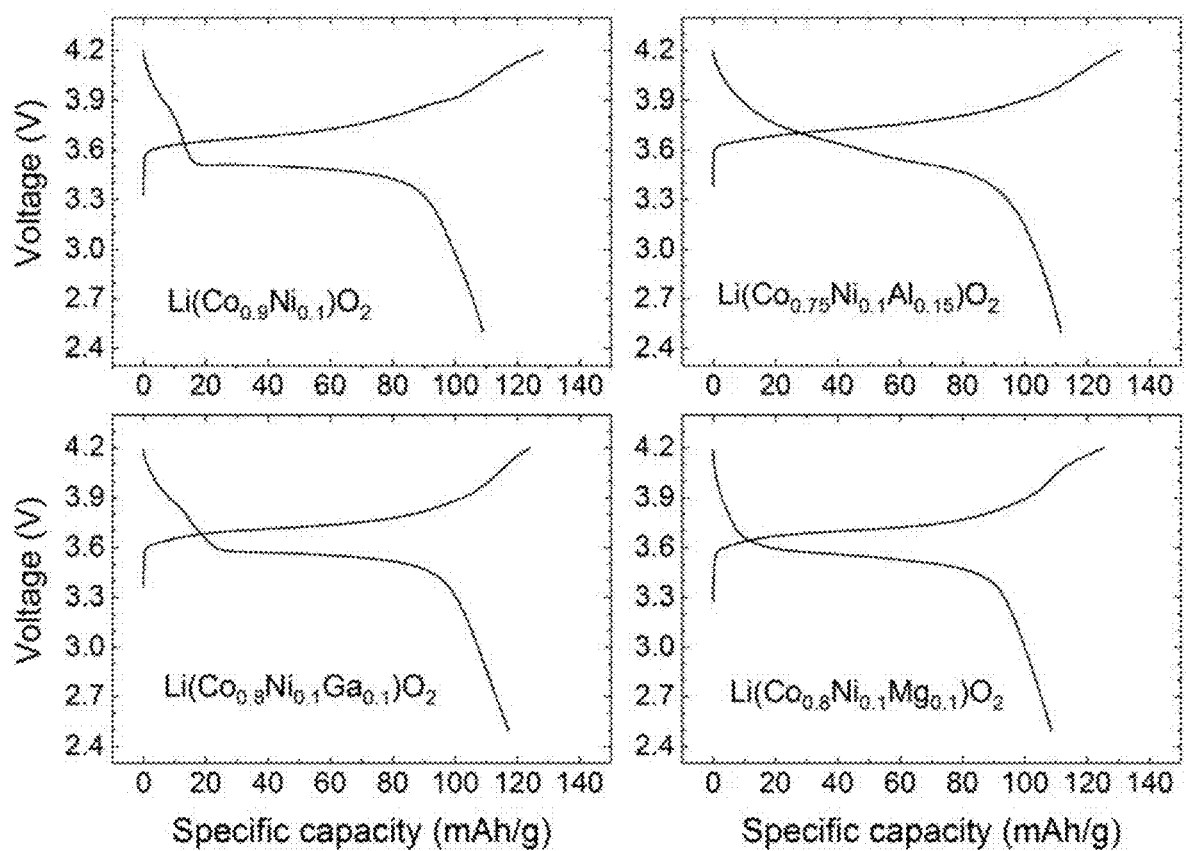
FIG. 10 depicts the initial charge and discharge voltage profiles of lithium cells with $LiCo_{0.9}Ni_{0.1}O_2$, $LiCo_{0.75}Ni_{0.1}Al_{0.15}O_2$, $LiCo_{0.8}Ni_{0.1}Ga_{0.1}O_2$, and $LiCo_{0.8}Ni_{0.1}Mg_{0.1}O_2$ electrodes cycled at 15 mA/g between 2.5-4.2 V vs. Li.
Figure 11:
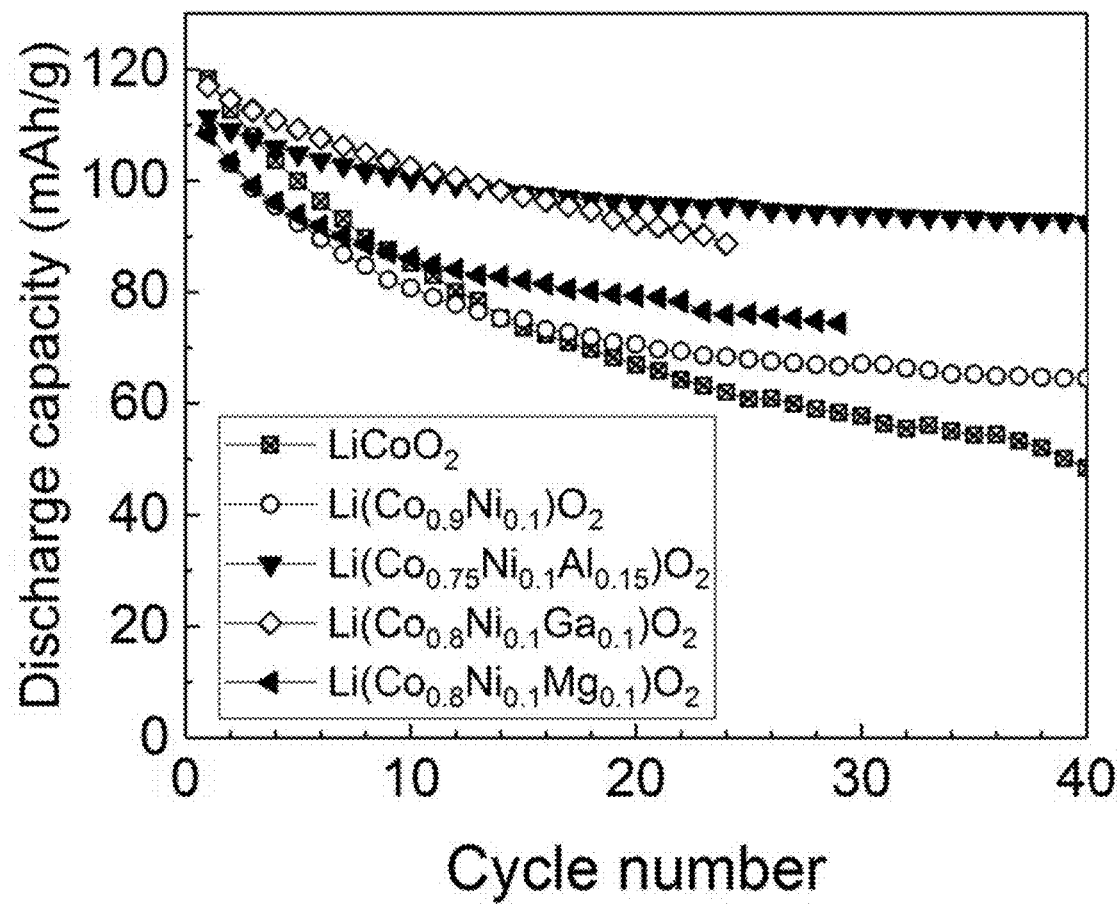
FIG. 11 depicts the electrochemical cycling performance of lithium cells with $LiCoO_2$, $LiCo_{0.9}Ni_{0.1}O_2$, $LiCO_{0.75}Ni_{0.1}Al_{0.15}O_2$, $LiCo_{0.8}Ni_{0.1}Ga_{0.1}O_2$, and $LiCo_{0.8}Ni_{0.1}Mg_{0.1}O_2$ electrodes cycled at 15 mA/g between 2.5-4.2 V vs. Li.
Figure 12:
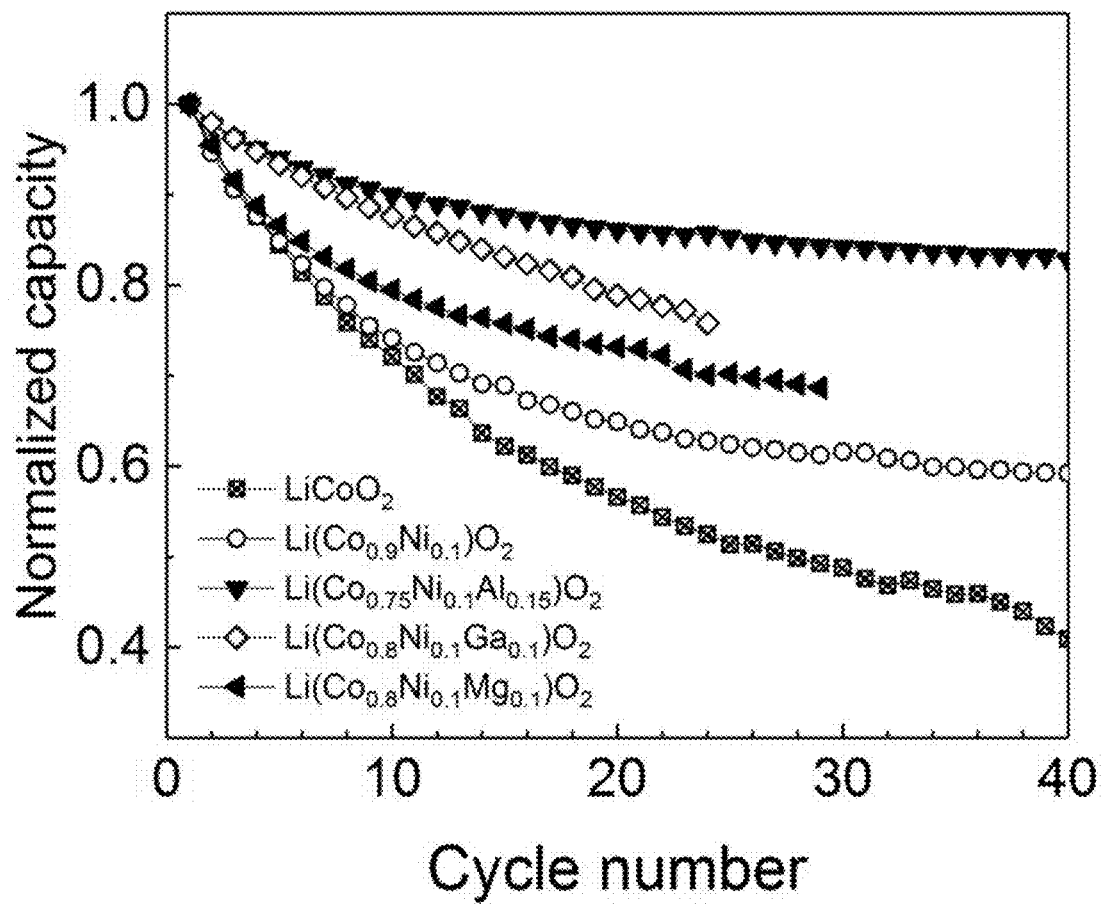
FIG. 12 depicts normalized specific capacity plots of $LiCoO_2$, $LiCo_{0.9}Ni_{0.1}O_2$, $LiCo_{0.75}Ni_{0.1}Al_{0.15}O_2$, $LiCo_{0.8}Ni_{0.1}Ga_{0.1}O_2$, and $LiCo_{0.8}Ni_{0.1}Mg_{0.1}O_2$ electrodes cycled at 15 mA/g between 2.5-4.2 V vs. Li.

FIG. 10 compares the voltage profiles of the lithium half cells with $LiCO_{0.9-z}Ni_{0.1}M'_zO_2$ lithiated spinel electrodes for M'=Al, Ga, and Mg. All the profiles indicate the electrochemical behavior of Co-based lithiated spinel phase characterized by the reversible redox process at approximately 3.6 V. The development of a sloping voltage profile is most predominant for Al-substitution. FIG. 11 demonstrates that inclusion of Al, Ga, and Mg improve the cycling stability of $Li(Co_{0.9}Ni_{0.1})O_2$ electrode over 30 cycles. The superior cycling stability of substituted electrode materials comprising Al, Ga, and Mg relative to unsubstituted $LiCoO_2$ and $LiCo_{0.9}Ni_{0.1}O_2$ electrodes is further highlighted in the normalized capacity vs. cycle number plot in FIG. 12.

Example 3. $LT-LiCo_{1-x}Al_xO_2$ Electrodes

Figure 15:
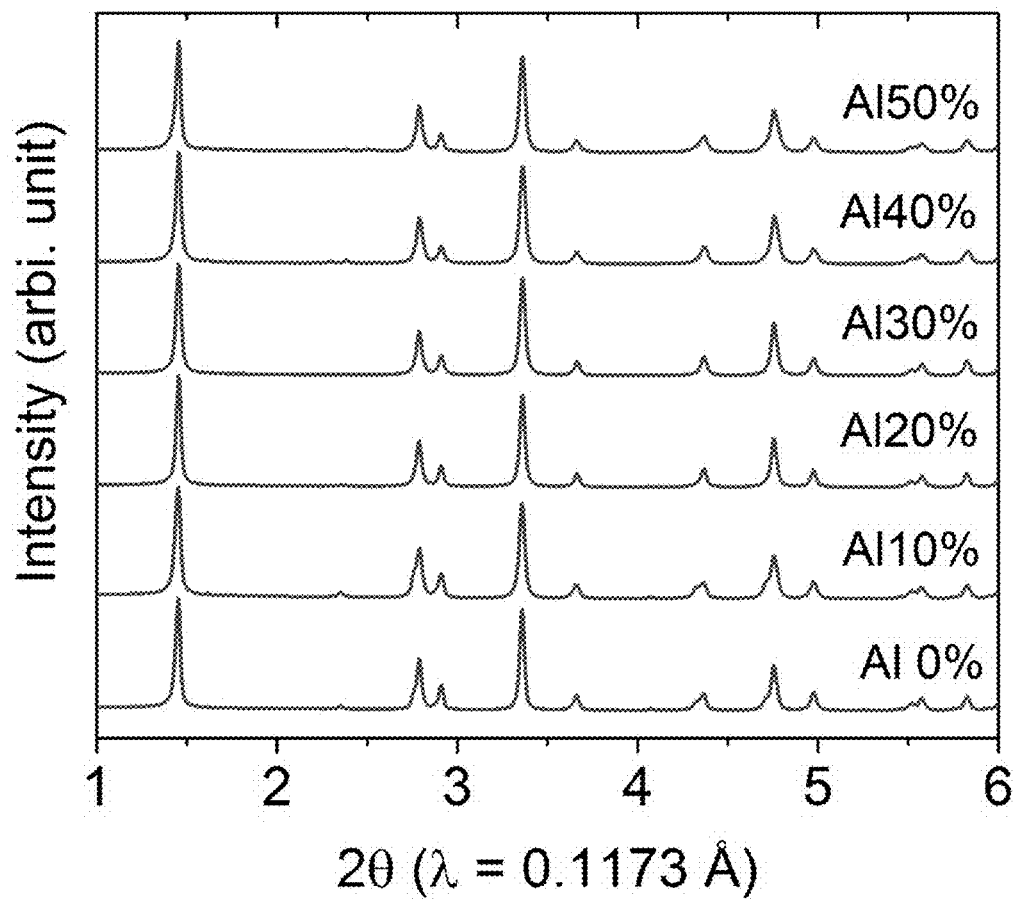
FIG. 15 depicts synchrotron X-ray diffraction patterns of LT-$LiCo_{1-x}Al_xO_2$ materials ($0 \leq x \leq 0.5$)

The powder X-ray diffraction patterns (synchrotron data) of $LT-LiCo_{1-x}Al_xO_2$ samples ($0 \leq x \leq 0.5$) are presented in FIG. 15, all of which could be indexed to a cubic unit cell. Remarkably, there is no significant difference between the "a" lattice parameter of the unsubstituted- and Al-substituted materials. A side product forms at higher Al concentrations (x>0.5), a $\gamma$-$LiAlO_2$. The unsubstituted composition LT-$LiCoO_2$ (abbreviated simply as LT-LCO in FIG. 15) contains a minor fraction of layered HT-$LiCoO_2$ with $R\bar{3}m$ symmetry as indicated by a broadening of the peaks at higher diffraction angles. Partial substitution of Co by Al removes the high-temperature phase from the samples, which remain essentially single phase to $x \approx 0.5$. The synthesis method is critical to making phase-pure materials. For example, NMR data showed that a $\gamma$-$LiAlO_2$ impurity is formed when a sol-gel method is used to prepare $LT-LiCo_{1-x}Al_xO_2$ materials, whereas a solid-state reaction method can result in complete, or essentially complete incorporation of all the aluminum within the $LiCo_{1-x}Al_xO_2$ structure.

Figure 16:
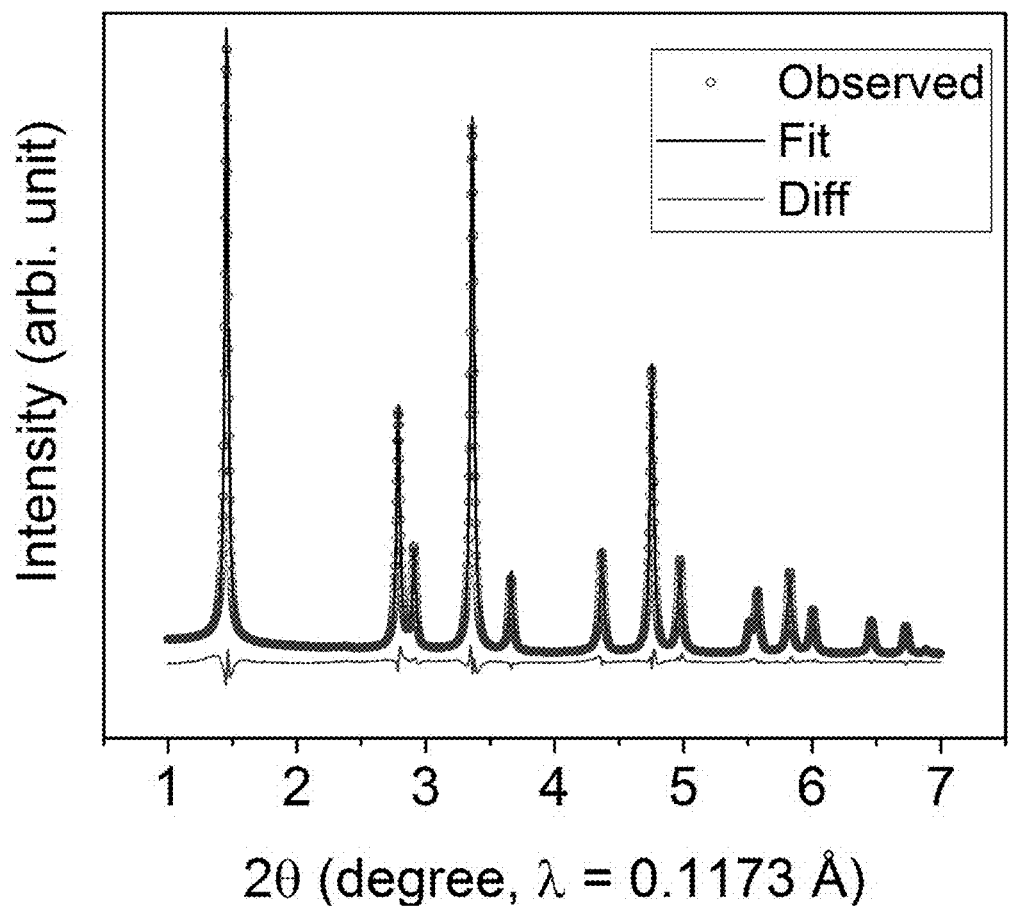
FIG. 16 depicts observed, calculated and difference profile refinement data of a $LiCo_{0.7}Al_{0.3}O_4$ sample.

To confirm that Al was incorporated within substituted $LT-LiCo_{1-x}Al_xO_2$ samples, Rietveld structural refinements were conducted using high-resolution synchrotron X-ray data of $LiCo_{1-x}Al_xO_2$ materials in which x=0.2 (20% Al) and 0.3 (30% Al). The observed, calculated, and difference patterns of the $LiCo_{0.7}Al_{0.3}O_2$ sample are provided in FIG. 16. A structural model of an ideal lithiated spinel, $[Li_2]_{16c}[Co_{2-x}Al_x]_{16d}O_4$ with cubic space group symmetry $Fd\bar{3}m$ was used for the initial refinement during which the site occupancy parameters of Co and Al on the octahedral 16d sites were allowed to vary. For this refinement, invariant isotropic temperature parameters (B) of 1.0 Å$^2$ and 0.5 Å$^2$ were assigned to the Li ions and to the Co and Al ions, respectively. This refinement revealed a lattice parameter of a=7.99 Å; the Al occupancy of the 16d sites was 0.309 (30.9%), in excellent agreement with the expected value of 30%. The weighted profile reliability factor, $R_{wp}$, for this analysis was 7.75. Two additional refinements were conducted on other possible structural configurations: (1) $[Li_{2-y}Al_y]_{16c}[Co_{2-x}Al_{x-y}Li_y]_{16d}O_4$ in which Al was allowed to exchange with Li on the octahedral 16c sites of the lithiated spinel structure and (2) $[Li_{2-y-z}Al_yCo_z]_{16c}[Co_{2-z}Al_{x-y}Li_{y+z}]_{16d}O_4$ in which Al and Co were allowed to exchange with Li on these sites. Both refinements yielded an identical, slightly lower $R_{wp}$ factor (7.60) than the $[Li_2]_{16c}[Co_{2-x}Al_x]_{16d}O_4$ model (7.75), the former refinement yielding 2.4% Al on the 16c sites, and the latter 1.5% Al and 0.9% Co on these sites. The refined lattice parameter of both structural configurations was a=7.99 Å, essentially identical to that of $LT-Li_2[Co_2]O_4$ (a=8.00 Å). It is believed that the cobalt ions in the Al-substituted compounds preferentially occupy the 16d sites of the lithiated spinel structure as they do in $LT-Li_2[Co_2]O_4$.

Figure 17:
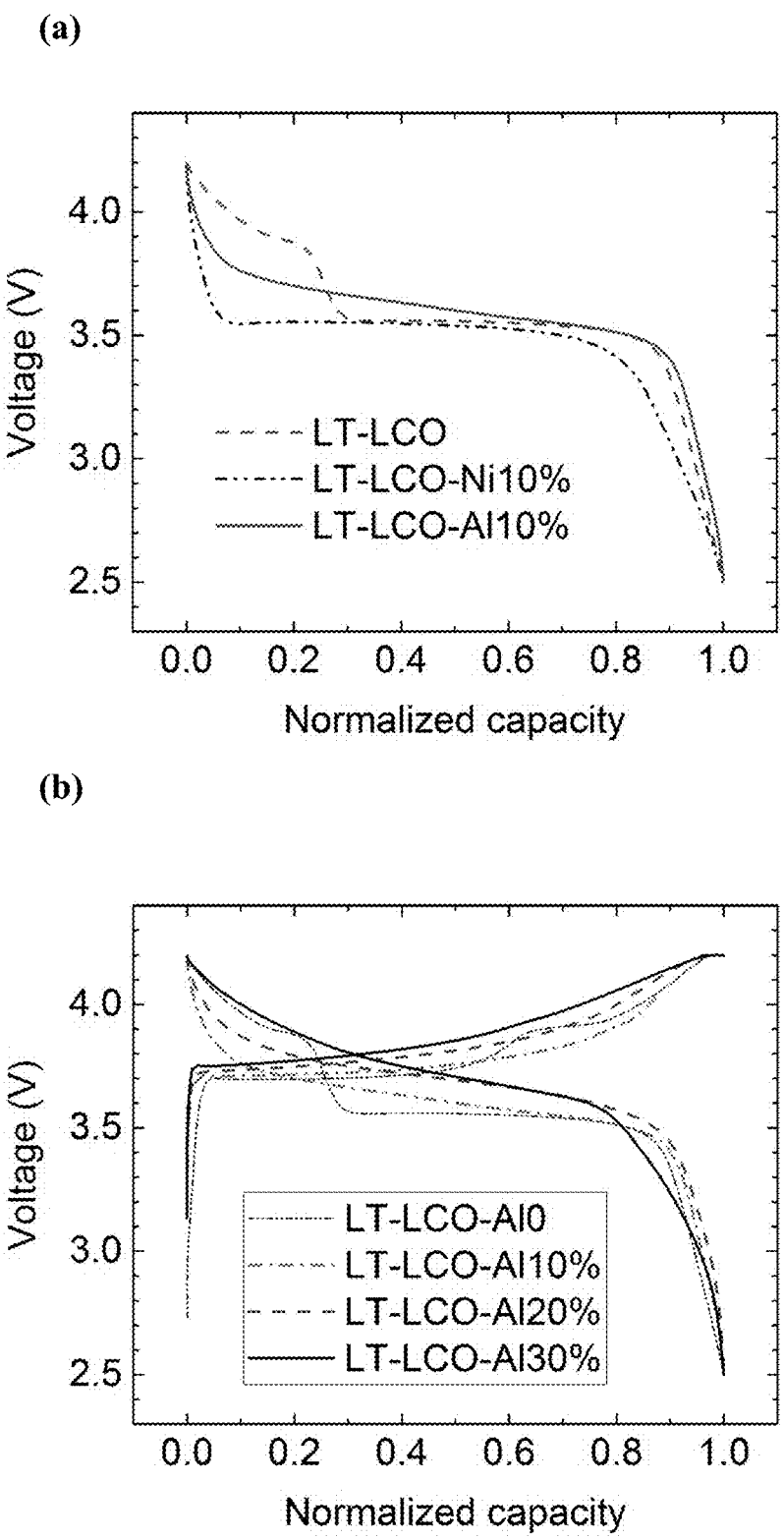
FIG. 17 depicts (a) comparison of the initial discharge profile (normalized capacity) of lithium cells with unsubstituted and 10%-substituted LT-$LiCo_{1-x}M_xO_2$ electrodes (M=Ni, Al), and (b) a comparison of the initial discharge profile (normalized capacity) of lithium cells with unsubstituted and substituted LT-$LiCo_{1-x}Al_xO_2$ electrodes for x=0, 0.1, 0.2 and 0.3.

The initial discharge profiles of lithium coin cells with $LT-LiCoO_2$ and substituted $LiCo_{0.9}Ni_{0.1}O_2$ and $LiCo_{0.9}Al_{0.1}O_2$ electrodes after being charged to 4.2 V are depicted in FIG. 17 (a). The cell voltage is plotted as a function of normalized capacity to enable an easy comparison of the profiles. The profile generated by the $LT-LiCoO_2$ electrode shows a single-phase reaction from a layered HT-$LiCoO_2$ component in the sample and a two-phase reaction from a $LT-LiCoO_2$ component, consistent with the X-ray diffraction data in FIG. 1 (a), and the reports by Gummow et al. and Lee et al. in *Materials Research Bulletin*, Volume 27, pages 327-337 (1992) and *Applied Materials & Interfaces*, Volume 8, pages 27720-27729 (2016), respectively. Substitution of Co by Ni suppresses the formation of the layered HT-$LiCoO_2$ component, as also previously reported by these authors, thereby yielding an essentially single-phase (lithiated spinel) electrode that operates predominantly at constant voltage via the two-phase lithiated-spinel (rock salt) to stoichiometric spinel reaction. In striking contrast, the sloping voltage profile of the Li/LT-LiCo$_{0.9}$Al$_{0.1}$O$_2$ cell of this invention is characteristic of a single-phase reaction that occurs significantly above the potential of the lithiated spinel-to-spinel transition (~3.5 V) observed in Li/LT-LiCoO$_2$ and Li/LT-LiCo$_{0.9}$Ni$_{0.1}$O$_2$ cells (FIG. 3 (a)). Furthermore, increasing the Al content in LT-LiCo$_{1-x}$Al$_x$O$_2$ electrodes from x=0.2 (10%) to x=0.6 (30%) raises the cell voltage further as shown in FIG. 17 (b).

Figure 18:
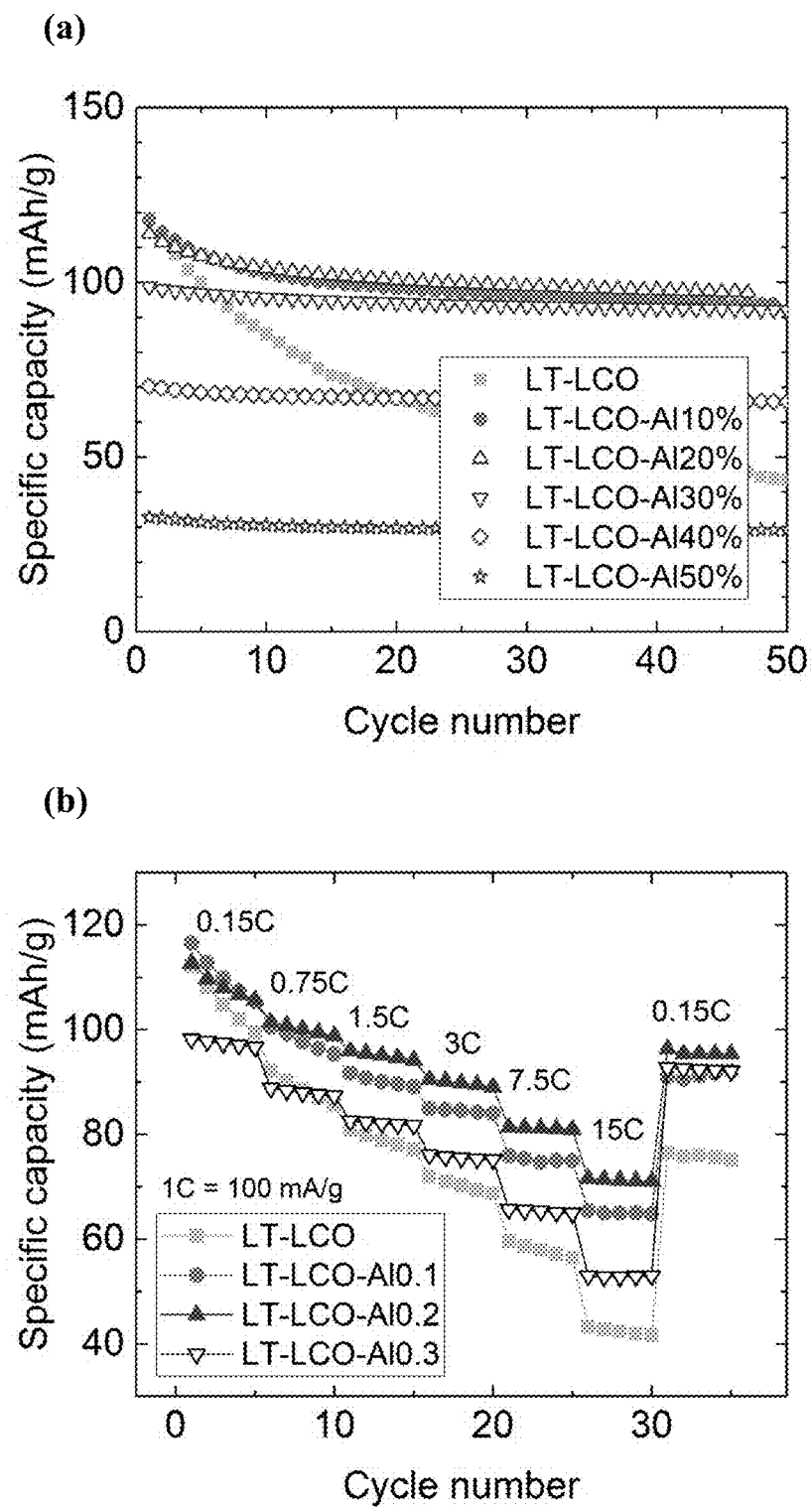
FIG. 18 depicts (a) capacity vs. cycle number for lithium cells with unsubstituted LT-$Li_2Co_2O_4$ and Al-substituted electrodes (0 to 50% Al) and (b) rate data for lithium cells with unsubstituted and substituted electrodes (0 to 30% Al).

FIG. 18 shows (a) plots of capacity vs. cycle number for lithium coin cells containing LT-LiCoO$_2$ and Al-substituted electrodes cycled at a constant 15 mA/g rate, and (b) capacity vs. cycle number as a function of the discharge rate. It is immediately clear that Al-substitution markedly improves the cycling stability of the LT-LiCoO$_2$ electrode, which undergoes significant capacity fade; the fade lessens as the degree of Al substitution increases (FIG. 18 (a)). Surprisingly, electrodes with 10, 20 and 30% Al provide similar capacities around 100 mAh/g after an initial 20 cycles. In contrast, there is a striking and surprising difference in their rate capability, the 20% Al-substituted electrode being superior to the 10%- and 30%-substituted materials and delivering, at a 15C rate, approximately 70% of their capacity (~100 mAh/g) at a 0.15C rate (FIG. 18 (b)).

Table 1 summarizes the theoretical and experimental electrochemical properties of LT-LiCo$_{1-x}$Al$_x$O$_2$ electrodes for 0≤x<0.5. The theoretical capacity of the electrode decreases with increasing x because Al is electrochemically inactive. It is to be noted that 0.5 Li could be extracted from unsubstituted electrodes (x=0) and those that contained 10% (x=0.1) and 20% (x=0.2) Al. Because Al is lighter than Co, the initial charge capacity of the electrode therefore increases from 133.8 mAh/g for x=0 to 147.5 for x=0.2, reflecting an increase in the utilization of the Co$^{3+/4+}$ redox couple from 49 to 63%. While capacities of ~100 mAh/g were delivered by these two electrodes on discharge (FIG. 18 (a)), electrodes with x≥0.3 yielded capacities less than 100 mAh/g, which is not surprising given the higher concentrations of the electrochemically inactive Al ions.

being annealed at 500° C. in air for 72 hours prior to electrode fabrication and cell assembly.

Figure 19:
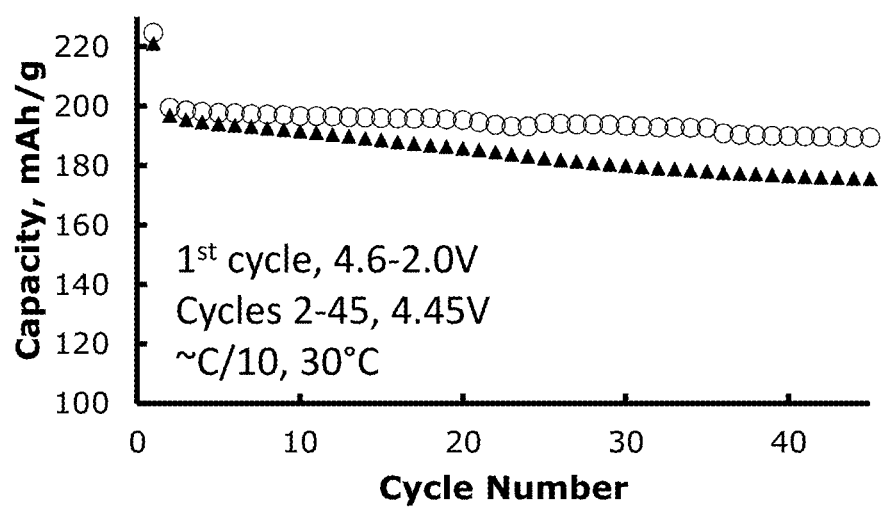
FIG. 19 depicts the comparison of discharge capacity vs. cycle number for a baseline Li/[$Li_{1.08}Mn_{0.54}Ni_{0.27}Co_{0.19}O_y$] cell and a cell in which the layered-layered-spinel (LLS), $Li_{1.08}Mn_{0.54}Ni_{0.27}Co_{0.19}O_y$ cathode had been surface treated in an aqueous solution of Li, Co, Ni, and Al nitrates.

FIG. 19 shows a comparison of discharge capacity vs. cycle number for a baseline Li/[Li$_{1.08}$Mn$_{0.54}$Ni$_{0.27}$Co$_{0.19}$O$_y$] cell and a cell in which the Li$_{1.08}$Mn$_{0.54}$Ni$_{0.27}$Co$_{0.19}$O$_y$, LLS cathode had been surface treated with a nominal composition of Li:Co:Ni:Al=2:1.85:0.1:0.05 in a solution of metal nitrates (Li, Co, Ni, Al) and glycolic acid, as described above. Cells were cycled between 4.45-2.5 V (Li/Li$^+$) after an initial activation charge and discharge cycle between 4.6-2.0 V (Li/Li$^+$). The coated LLS electrode exhibits slightly higher first-cycle discharge capacity (~5 mAh/g) and a 2% improvement in first-cycle efficiency. This indicates that the coating does not impede Li-ion diffusion relative to the uncoated material and that unwanted electrolyte reactions associated with poor efficiency have been somewhat mitigated. On cycling, the baseline (uncoated) LLS electrode shows an 11% capacity loss over the 45 cycles on test (relative to the 2$^{nd}$ cycle discharge capacity), whereas the coated LLS shows only a 5% loss, thereby highlighting the effectiveness of the coating.

The improved cycling stability of the lithiated cobalt and nickel spinel electrode materials that is imparted by substitution of stabilizing M' cations, such as Al, into the structure as taught herein, therefore renders these materials useful for imparting greater surface stability to an underlying metal oxide electrode for lithium batteries, such as layered (LiMO$_2$), spinel (LiM$_2$O$_4$) or olivine (LiMPO$_4$) cathodes in which M is typically a first row transition metal ion such as Co, Ni, Mn, Fe). As such, the materials described herein may be used as surface stabilizers for such electrodes, whether in their fully discharged, lithiated state, or in a partially delithiated-, or fully charged state. Thus, in another aspect, an electrode comprises electrochemically-active metal oxide particles comprising a lithiated cobalt and/or nickel spinel electrode material of formula Li$_2$(Co$_{1-x}$Ni$_x$)$_2$O$_4$, Li$_2$(Co$_{1-x}$Ni$_x$)$_{2-2z}$M'$_{2z}$O$_4$ or Li(Co$_{1-x}$Ni$_x$)$_{1-z}$M'$_z$O$_2$ as described herein on the surface of the electrochemically-active metal oxide particles.

TABLE 1

Theoretical and experimental properties of LT-LiCo$_{1-x}$Al$_x$O$_2$ electrodes for 0 ≤ x ≤ 0.5.

| Sample | MW [g/mol] | Theor. Redox Cap. Co$^{3+/4+}$ [mAh/g] | 1$^{st}$ Charge Cap. [mAh/g] | Extract. Li [mol] | Co Util. [%] (Redox) | 1$^{st}$ Discharge capacity [mAh/g] | Coulombic Efficiency (%) |
|---|---|---|---|---|---|---|---|
| LT-LiCoAlO$_2$ | 97.873 | 273.8 | 133.8 | 0.49 | 49 | 110.4 | 83 |
| LT-LiCo$_{0.9}$Al$_{0.1}$O$_2$ | 94.678 | 254.8 | 141.0 | 0.50 | 55 | 117.9 | 84 |
| LT-LiCo$_{0.8}$Al$_{0.2}$O$_2$ | 91.483 | 234.4 | 147.5 | 0.50 | 63 | 113.9 | 77 |
| LT-LiCo$_{0.7}$Al$_{0.3}$O$_2$ | 88.288 | 212.5 | 128.8 | 0.42 | 61 | 98.8 | 77 |
| LT-LiCo$_{0.6}$Al$_{0.4}$O$_2$ | 85.092 | 189.0 | 95.3 | 0.30 | 50 | 70.3 | 74 |
| LT-LiCO$_{0.5}$Al$_{0.5}$O$_2$ | 81.897 | 163.6 | 66.9 | 0.20 | 41 | 32.8 | 49 |

Example 4. Surface Stabilization

Synthesis

Figure 13:
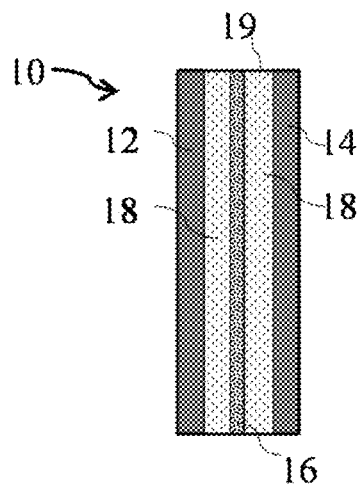
FIG. 13 depicts a schematic representation of an electrochemical cell.
Figure 14:
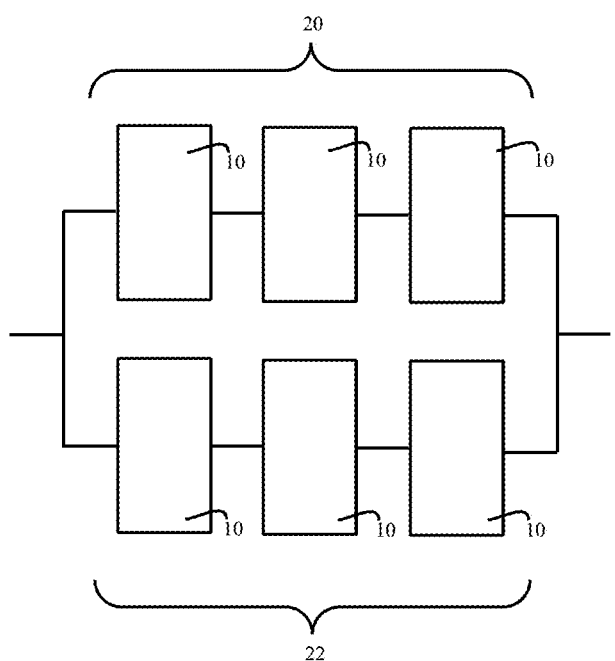
FIG. 14 depicts a schematic representation of a battery consisting of a plurality of cells connected electrically in series and in parallel.

The desired amounts of metal nitrates (Li, Co, Ni, Al) for a nominal ratio of 2:1.85:0.1:0.05 (Li:Co:Ni:Al) were dissolved in deionized water along with glycolic acid (acid:metal=~1.0) as chelating agent. Subsequently, a layered-layered-spinel cathode powder of nominal composition Li$_{1.08}$Mn$_{0.54}$Ni$_{0.27}$Co$_{0.19}$O$_y$ was added to the solution while stirring and stirred for a further ~2 hours at ~65° C. The solution was then evaporated, under stirring, at ~100° C. and the resultant powder dried overnight at ~110° C. before Example 5. Exemplary Electrochemical Cell and Battery FIG. 13 schematically illustrates a cross-sectional view of lithium-ion electrochemical cell 10 comprising cathode 12, and anode 14, with porous separator 16 therebetween. Electrolyte 18, comprising a solution of a lithium salt in a non-aqueous solvent, contacts electrodes 12 and 14 and separator 16. The electrodes, separator and electrolyte are sealed within housing 19. FIG. 14 schematically illustrates a lithium-ion battery comprising a first cell bank 20 consisting of three series-connected electrochemical cells 10, and a second cell bank 22 consisting of three series-connected electrochemical cells 10, in which first bank 20 is electrically connected to second bank 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing any material, method or device (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of any invention described herein and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments in which an exclusive property or privilege is claimed are defined as follows:

1. A lithium metal oxide electrode material comprising a disordered rock salt structure with partial lithiated-spinel character, wherein the material has a formula $Li_2(M''_{2-a}M'_a)O_4$; wherein M" comprises Co; M'" comprises one or more metals selected from the group consisting of Al, Mg and Ti; $0<a\leq0.5$; and the material of formula $Li_2(M''_{2-a}M'''_a)O_4$ has the crystallographic formula: $[Li_{2-b}M'''_b]_{16c}[M''_{2-a}M'_{a-b}Li_b]_{16d}O_4$, wherein 16c and 16d refer to the octahedral sites of the prototypic space group symmetry Fd3m, and $0<b<0.5$.

2. The electrode material of claim 1, wherein M" further comprises one or more metal selected from the group consisting of Ni, Mn, V, and Fe.

3. The electrode material of claim 1, wherein $0<a-b<0.2$.

4. The electrode material of claim 1, wherein $0<a<0.3$ and $0<a-b<0.1$.

5. The electrode material of claim 1, wherein $0<a-b<0.05$.

6. The electrode material of claim 1, wherein M" comprises one or more metals selected from the group consisting of Co, Ni, and Mn; and M'" is Al.

7. The electrode material of claim 6, wherein M" is Co.

8. The electrode material of claim 6, wherein $0<a<0.3$ and $0<a-b<0.1$.

9. The electrode material of claim 6, wherein $0<a-b<0.05$.

10. The electrode material of claim 6, wherein the material has a structure that is either cation or anion deficient, or both.

11. The electrode material of claim 1, wherein the material has a structure that is either cation or anion deficient, or both.

12. The electrode material of claim 1, wherein the Li, M" and M'" cations are partially disordered over the 16c and 16d octahedral sites.

13. The electrode material of claim 1, wherein the lithium metal oxide electrode material is structurally integrated with a two-component layered-layered material of formula: $wLi_2MnO_3\cdot(1-w)LiMO_2$, wherein M comprises one or more metal cations; and $0<w<1$.

14. The electrode material of claim 13, wherein M comprises one or more cations selected from the group consisting of Ni, Mn, and Co.

15. The electrode material of claim 13, wherein the Li, Co, Ni, Mn, M" and M'" cations are partially disordered over octahedral sites of layered and lithiated spinel component structures.

16. The electrode material of claim 6, wherein the lithium metal oxide electrode material is structurally integrated with a two-component layered-layered material of formula: $wLi_2MnO_3\cdot(1-w)LiMO_2$, wherein M comprises one or more metal cations; and $0<w<1$.

17. The electrode material of claim 16, wherein M comprises one or more cations selected from the group consisting of Ni, Mn, and Co.

18. The electrode material of claim 16, wherein the Li, Co, Ni, Mn, M" and M'" cations are partially disordered over octahedral sites of layered and lithiated spinel component structures.

19. An electrode comprising the electrode material of claim 1 supported on a metallic current collector.

20. An electrochemical cell comprising an anode, a cathode, and a lithium-containing electrolyte contacting the anode and cathode, wherein one or more of the anode and the cathode is the electrode of claim 19.

21. A battery comprising a plurality of electrochemical cells of claim 20 electrically connected in series, in parallel, or in both series and parallel.

22. A lithium metal oxide electrode material comprising a disordered rock salt structure with partial lithiated-spinel character, wherein the material has a formula $Li_2(M''_{2-a}M'''_a)O_4$; wherein M" comprises Co; M'" comprises one or more metals selected from the group consisting of Al, Mg and Ti; $0<a\leq0.5$; and less than 25 percent of the Li in the material resides in octahedral crystallographic sites that also contain both M" and M'".

\* \* \* \* \*

UNITED STATES PATENT AND TRADEMARK OFFICE
CERTIFICATE OF CORRECTION

| | | |
|---|---|---|
| PATENT NO. | : 12,206,101 B2 | Page 1 of 1 |
| APPLICATION NO. | : 17/203999 | |
| DATED | : January 21, 2025 | |
| INVENTOR(S) | : Michael M. Thackeray, Eungje Lee and Jason R. Croy | |

It is certified that error appears in the above-identified patent and that said Letters Patent is hereby corrected as shown below:

In the Claims

Claim 1, Line 1, delete "M'a)" and insert --M'''a)--.
        Line 5, delete "M'a-b" and insert --M'''a-b--.
        Line 7, delete "Fd3m" and insert --$Fd\bar{3}m$--.

Signed and Sealed this
Twenty-fifth Day of March, 2025

Coke Morgan Stewart
*Acting Director of the United States Patent and Trademark Office*